United States Patent
Nishizaki et al.

(10) Patent No.: US 6,415,215 B1
(45) Date of Patent: Jul. 2, 2002

(54) VEHICLE ATTITUDE CONTROL APPARATUS

(75) Inventors: Katsutoshi Nishizaki, Nabari; Shiro Nakano, Osaka; Masaya Segawa, Tenri; Ryouhei Hayama, Nabari, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/777,793

(22) Filed: Feb. 6, 2001

(30) Foreign Application Priority Data

Feb. 23, 2000 (JP) .................................. 2000-046299
Feb. 23, 2000 (JP) .................................. 2000-046445
Feb. 23, 2000 (JP) .................................. 2000-046527

(51) Int. Cl.$^7$ .............................. B60T 8/24; G06F 19/00
(52) U.S. Cl. .............................. 701/70; 701/1; 701/36; 701/72; 701/42; 701/8; 701/220; 701/207; 701/41; 701/96; 701/84; 701/74; 303/140; 303/146; 303/148; 303/147; 180/197; 180/167; 180/445; 180/168; 180/443; 180/400; 340/436; 340/435; 340/465
(58) Field of Search .......................... 701/36, 70, 1, 701/72, 42, 80, 220, 207, 41, 96, 84, 74; 303/140, 146, 147, 148; 180/197, 445, 167, 168, 443, 400, 411, 412, 446, 415, 422; 340/436, 435, 465

(56) References Cited

U.S. PATENT DOCUMENTS

| | | | | |
|---|---|---|---|---|
| 5,229,944 A | * | 7/1993 | Yasuno | 303/146 |
| 5,303,989 A | * | 4/1994 | Yasuno et al. | 303/113.5 |
| 5,576,959 A | * | 11/1996 | Hrovat et al. | 180/197 |
| 5,702,165 A | * | 12/1997 | Koibuchi | 303/146 |
| 5,899,952 A | * | 5/1999 | Fukada | 303/146 |
| 5,915,800 A | * | 6/1999 | Hiwatashi et al. | 303/146 |
| 6,219,609 B1 | * | 4/2001 | Matsuno et al. | 303/140 |

* cited by examiner

Primary Examiner—William A. Cuchlinski, Jr.
Assistant Examiner—Ronnie Mancho
(74) Attorney, Agent, or Firm—Jordan and Hamburg LLP

(57) ABSTRACT

In a vehicle attitude control apparatus, a steering actuator is controlled so that a steering angle matches a target steering angle. In an understeer condition; the braking force on the inside wheels is increased and drive power applied to the outside wheels is larger than applied to inside wheels. In an oversteer condition, the braking force on the outside wheels is increased and drive power applied to the inside wheels is larger than applied to outside wheels. The steering actuator is controlled so that a behavior index value corresponding to the change in the vehicle'behavior, that occurs based on the change in the steering angle, matches a target behavior index value that reflects the amount of operation of an operation member. A vehicle yaw moment and an amount of control of the steering actuator vary due to steer conditions, wheel lateral slip angle and brake force control.

19 Claims, 10 Drawing Sheets

Fig.4 (1)
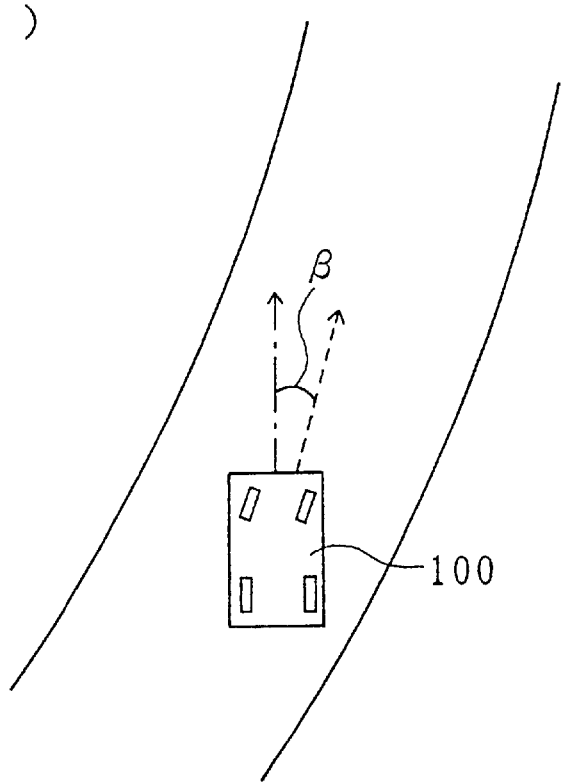
Fig.4 (2)
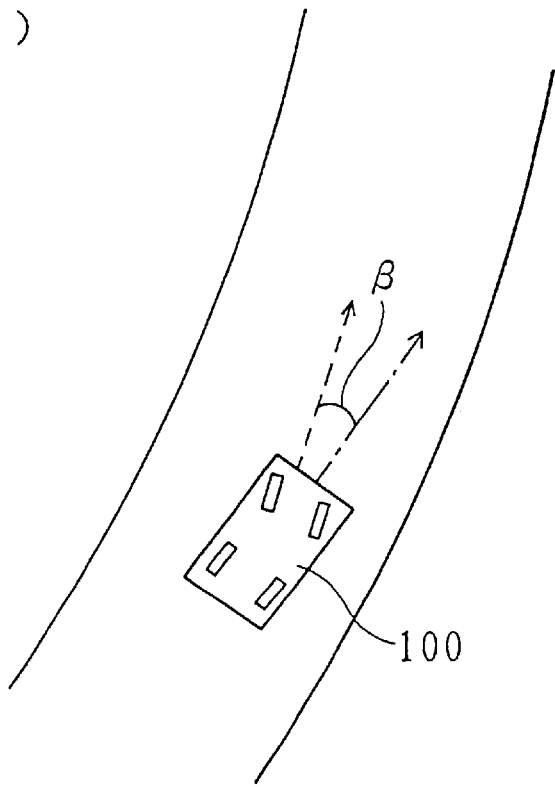

VEHICLE ATTITUDE CONTROL APPARATUS

FIELD OF THE INVENTION

The present invention relates to a vehicle attitude control apparatus that can stabilize the movement of the vehicle.

DESCRIPTION OF THE RELATED ART

When a vehicle is in an understeer or oversteer condition, the vehicle's attitude is controlled through the control of the braking force or drive power applied to the vehicle. In other words, when the vehicle is in an understeer condition, the braking force applied to the wheels on the inside of the turn is made to exceed the braking force applied to the wheels on the outside of the turn, or the drive power applied to the outside wheels is made to exceed the drive power applied to the inside wheels. When a vehicle is in an oversteer condition, the braking force applied to the outside wheels is made to exceed the braking force applied to the inside wheels, or the drive power applied to the inside wheels is made to exceed the drive power applied to the outside wheels. In this way, a yaw moment that stabilizes the movement of the vehicle is generated.

In a vehicle in which the steering angle is changed in accordance with the movement of a steering actuator driven in response to the operation of a steering wheel, a target steering angle corresponding to the amount of operation of the steering wheel is sought, and the steering angle is subjected to feed forward control so that the actual steering angle will match the target steering angle.

Conventionally, this braking force control and steering angle control have been performed independently of each other. As a result, where the movement of the vehicle changes due to the application of braking force control, it has been necessary to subject the steering angle to feedback control so that behavior index value corresponding to the change in the movement of the vehicle, such as the yaw rate, matches the target behavior index value corresponding to the amount of operation of the steering wheel, such as the target yaw rate.

However, the problem arises that the stability of the vehicle's behavior is reduced due to the time lag between the change in the vehicle's behavior due to the application of braking control and the feeding back of the behavior index value corresponding to the change in the vehicle's behavior to the steering control.

Furthermore, the problem also arises that the yaw moment that stabilizes the movement of the vehicle declines, when the linear region in which the wheel lateral slip angle is proportional to the cornering force can no longer be maintained due to an excessive increase in the steering angle in order to eliminate the understeer condition, or when the braking force applied to the inner wheels becomes excessive.

Conventionally, when a vehicle is in an understeer condition, only the braking force applied to the inside rear wheel is increased, and the braking force applied to the inside front wheel is not increased. Furthermore, when a vehicle is in an oversteer condition, only the braking force applied to the outside front wheel is increased, and the braking force applied to the outside rear wheel is not increased. This is based on the fact that an increase in the braking force on the inside front wheel in an understeer situation or on the outside rear wheel in an oversteer situation is thought to have a negative impact on the stability of the vehicle's behavior. In other words, if the braking force on the inside front wheel is increased when the vehicle is in an understeer condition or the braking force on the outside rear wheel is increased when the vehicle is in an oversteer condition, the yaw moment that stabilizes the vehicle's behavior is thought to decline. However, conventional braking force control cannot sufficiently stabilize the vehicle's behavior, and further vehicle movement stabilization is desired.

An object of the present invention is to provide a vehicle attitude control apparatus that resolves the above problems.

SUMMARY OF THE INVENTION

A first aspect of the present invention comprises a vehicle attitude control apparatus that can individually control the braking force applied to the right and left wheels so that when the vehicle is in an understeer condition, the braking force applied to the inside wheels is larger than the braking force applied to the outside wheels, and when the vehicle is in an oversteer condition, the braking force applied to the outside wheels is larger than the braking force applied to the inside wheels, such apparatus includes an operation member, a steering actuator that is driven in accordance with the operation of the operation member, means for transmitting the movement of the steering actuator to the wheels so that the steering angle changes in response to this movement, means for seeking a behavior index value corresponding to the change in vehicle movement based on the change in the steering angle, means for seeking the amount of operation of the operation member, means for seeking a target behavior index value corresponding to the sought amount of operation of the operation member based on a stored relationship between the amount of operation and the target behavior index value, means for seeking the braking force applied to each wheel, means for seeking a braking force difference between the braking force applied to the inside wheels and the braking force applied to the outside wheels, means for calculating a steering angle set value corresponding to the sought target behavior index value and braking force difference based on a stored relationship between the target behavior index value, the braking force difference and the steering angle set value, means for calculating a steering angle correction value corresponding to the difference between the sought behavior index value and target behavior index value based on a stored relationship between this difference and the steering angle correction value, and means for controlling the steering actuator so that the steering angle matches the target steering angle which is the sum of the steering angle set value and the steering angle correction value.

A second aspect of the present invention comprises a vehicle attitude control apparatus that can individually control the drive power applied to the right and left wheels so that when the vehicle is in an understeer condition, the drive power applied to the inside wheels is larger than the drive power applied to the outside wheels, and when the vehicle is in an oversteer condition, the drive power applied to the outside wheels is larger than the drive power applied to the inside wheels, such apparatus includes an operation member, a steering actuator that is driven in accordance with the operation of the operation member, means for transmitting the movement of the steering actuator to the wheels so that the steering angle changes in response to this movement, means for seeking a behavior index value corresponding to the change in the movement of the vehicle that occurs based on the change in the steering angle, means for seeking the amount of operation of the operation member, means for seeking a target behavior index value corresponding to the sought amount of operation of the operation member based on a stored relationship between the amount of operation and the target behavior index value, means for seeking the drive power applied to each wheel, means for seeking a drive power difference between the drive power applied to the inside wheels and the drive power applied to the outside wheels, means for calculating a steering angle set value corresponding to the sought target behavior index value and drive power difference based on a stored relationship between the target behavior index value, the drive power difference and the steering angle set value, means for calculating a steering angle correction value corresponding to the difference between the sought behavior index value and the target behavior index value based on a stored relationship between this difference and the steering angle correction value, and means for controlling the steering actuator so that the steering angle matches a target steering angle which is the sum of the steering angle set value and the steering angle correction value.

In the first aspect of the present invention, when the vehicle is in the understeer condition, the vehicle yaw moment acting toward the inside of the turn is increased by increasing the braking force applied to the inside wheels such that it exceeds the braking force applied to the outside wheels, and when the vehicle is in the oversteer condition, the vehicle yaw moment acting toward the outside of the turn is increased by increasing the braking force applied to the outside wheels such that it exceeds the braking force applied to the inside wheels.

In the second aspect of the present invention, when the vehicle is in the understeer condition, the vehicle yaw moment acting toward the inside of the turn is increased by increasing the drive power applied to the outside wheels such that it exceeds the drive power applied to the inside wheels, and when the vehicle is in the oversteer condition, the vehicle yaw moment acting toward the outside of the turn is increased by increasing the drive power applied to the inside wheels such that it exceeds the drive power applied to the outside wheels.

According to the first aspect of the present invention, the steering actuator is controlled such that the steering angle matches the target steering angle, which is the sum of the steering angle set value and the steering angle correction value. The steering angle set value corresponds to the target behavior index value set in accordance with the amount of operation of the operation member, and the braking force difference between the right and left wheels. The steering angle correction value corresponds to the difference between the target behavior index value and the sought behavior index value. According to the second aspect of the present invention, the steering actuator is controlled such that the steering angle matches the target steering angle corresponding to the sum of the steering angle set value and the steering angle correction value. The steering angle set value corresponds to the target behavior index value reflecting the amount of operation of the operation member, and the drive power difference between the right and left wheels. The steering angle correction value corresponding to the difference between the target behavior index value and the sought behavior index value. Because the steering angle set value corresponds to the feed forward component of the target steering angle and the steering angle correction value corresponds to the feedback component of the target steering angle, feed forward control and feedback control are performed.

According to the first aspect of the present invention, because the steering angle set value is determined in accordance with both the amount of operation of the operation member and the braking force difference between the right and left wheels, when the vehicle movement is stabilized by the braking force control, the steering angle can be controlled by the feed forward control in accordance with the braking force difference. According to the second aspect of the present invention, because the steering angle set value is determined in accordance with both the amount of operation of the operation member and the drive power difference between the right and left wheels, when the vehicle movement is stabilized by the drive power control, the steering angle can be controlled by the feed forward control in accordance with the drive power difference. Therefore, according to both aspects of the present invention, the responsiveness of the control and the stabilization of vehicle movement can be attained more effectively than when the steering angle is controlled only by the feedback control in accordance with the behavior index value obtained based on the control of the braking force or the drive power.

According to the first and second aspects of the present invention, in a case where the vehicle's behavior is stabilized by controlling the braking force or the drive power applied to the right and left wheels when the vehicle is in the understeer or oversteer condition, the vehicle movement can be stabilized by the feed forward control of the steering angle not only in accordance with the amount of operation of the operation member, but also in accordance with the difference in the braking force between the outside wheels and the inside wheels or the difference in the drive power between the outside wheels and the inside wheels.

The third aspect of the present invention is applied in a vehicle attitude control apparatus, in which the braking force applied to the right and left wheels can be individually controlled such that when the vehicle is in an understeer condition, the braking force applied to the inside wheels exceeds the braking force applied to the outside wheels, while when the vehicle is in an oversteer condition, the braking force applied to the outside wheels exceeds the braking force applied to the inside wheels.

The third aspect of the present invention includes an operation member, a steering actuator that is driven in accordance with the operation of the operation member, means for transmitting the movement of the steering actuator to the wheels so that the steering angle changes in response to this movement, means for seeking a behavior index value corresponding to the change in the movement of the vehicle that occurs based on the change in the steering angle, means for seeking the amount of operation of the operation member, means for seeking a target behavior index value corresponding to the sought amount of operation of the operation member based on a stored relationship between the amount of operation and the target behavior index value, means for controlling the steering actuator so that the behavior index value matches the sought target behavior index value, means for seeking a wheel lateral slip angle, means for seeking the braking force applied to the inside wheel that maximizes the vehicle yaw moment acting toward the inside of the turn, when the vehicle is determined to be in the understeer condition, based on a stored equation, and means for determining whether or not the size of the sought wheel lateral slip angle equals or exceeds a predetermined maximum value when it is determined that the vehicle is in the understeer condition, wherein when the sought wheel lateral slip angle equals or exceeds the predetermined maximum value, braking force control is performed so that the sought braking force is applied, and the amount of control of the steering actuator to ensure that the behavior index value matches the target behavior index value is minimized, and when the sought wheel lateral slip angle is less than the predetermined maximum value, as the sought wheel lateral slip angle decreases, the amount of braking force control is reduced and the amount of control of the steering actuator to ensure that the behavior index value matches the target behavior index value is increased.

Through this constitution, when the steering actuator is controlled so that the difference between the vehicle target behavior index value corresponding to the amount of operation of the operation member and the detected behavior index value is reduced, the occurrence of the understeer condition or the oversteer condition as a result of the change in the steering angle due to the movement of the steering actuator can be prevented, by the application of the braking force. In other words, the vehicle's behavior can be stabilized by the integrated control of the steering angle and the braking force.

Furthermore, in a state where the size of the wheel lateral slip angle equals or exceeds the predetermined maximum value when the vehicle is in the understeer condition, the braking force is applied to the inside wheels in order to maximize the vehicle yaw moment acting toward the inside of the turn, and the amount of control of the steering actuator to ensure that the behavior index value matches the target behavior index value is minimized. In a case where the size of the wheel lateral slip angle is less than the predetermined maximum value when the vehicle is in the understeer condition, as the size of the wheel lateral slip angle decreases, the amount of braking force is reduced and the amount of control of the steering actuator to ensure that the behavior index value matches the target behavior index value is increased. In this way, when the vehicle is in the understeer condition, an excessive increase in the steering angle and the excessive application of braking force to the inside wheels can be prevented, so as to prevent a reduction in the yaw moment that acts to stabilize the vehicle. In addition, the amount of braking force stabilizing the vehicle behavior can be increased as the vehicle's behavior becomes more unstable and the lateral slip angle becomes larger, without the need for complicated control process.

A fourth aspect of the present invention comprises a vehicle attitude control apparatus that can individually control the braking force applied to each of the four wheels such that the braking force applied to the inside wheels exceeds the braking force applied to the outside wheels when the vehicle is in an understeer condition, and the braking force applied to the outside wheels exceeds the braking force applied to the inside wheels when the vehicle is in an oversteer condition, such vehicle attitude control apparatus further characterised in that the control is performed such that braking force applied to the front and rear inside wheels is increased when the vehicle is in the understeer condition, and the braking force applied to the front and rear outside wheels is increased when the vehicle is in an oversteer condition.

The fourth aspect of the present invention is based on the discovery that the vehicle yaw moment acting toward the inside of the turn can be increased when the vehicle is in the understeer condition by increasing the braking force on the front inside wheel, and the vehicle yaw moment acting toward the outside of the turn can be increased when the vehicle is in the oversteer condition by increasing the braking force on the rear outside wheel. In this way, the yaw moment that serves to stabilize the vehicle can be increased beyond the level obtained in the conventional art.

It is preferred that the fourth aspect of the present invention includes an operation member, a steering actuator that is driven in accordance with the operation of the operation member, means for transmitting the movement of the steering actuator to the wheels so that the steering angle changes in response to the movement of the actuator, means for seeking a behavior index value corresponding to the change in the movement of the vehicle that occurs based on the change in the steering angle, means for seeking the amount of operation of the operation member, means for seeking a target behavior index value corresponding to the sought amount of operation of the operation member based on a stored relationship between the amount of operation and the target behavior index value, means for controlling the steering actuator so that the behavior index value matches the sought target behavior index value, means for determining whether the vehicle is in the understeer or the oversteer condition based on at least the sought behavior index value and the target behavior index value, means for seeking, based on a stored equation, the braking force applied to the front and rear inside wheels that will maximize the vehicle yaw moment acting toward the inside of the turn when the vehicle is determined to be in the understeer condition, and means for seeking the braking force applied to the front and rear outside wheels that maximize the vehicle yaw moment acting toward the outside of the turn when the vehicle is determined to be in the oversteer condition, based on a stored equation.

By this constitution, in a state where the steering actuator is controlled so that the difference between the vehicle target behavior index value corresponding to the amount of operation of the operation member and the detected behavior index value is reduced, the occurrence of the understeer condition or the oversteer condition as a result of the change in the steering angle due to the movement of the steering actuator can be prevented, by the application of the braking force. In other words, the vehicle's behavior can be stabilized by the integrated control of the steering angle and the braking force.

In the fourth aspect of the present invention, it is preferred that the vehicle attitude control apparatus further includes means for seeking the vehicle body lateral slip angle in time series, wherein: when the sought behavior index value is less than the target behavior index value and the sought vehicle body lateral slip angle is changing so as to bring the behavior index value closer to the target behavior index value, it is determined that the vehicle is in the understeer condition; when the sought behavior index value is less than the target behavior index value and the sought vehicle body lateral slip angle is changing so as to move the behavior index value away from the target behavior index value, it is determined that the vehicle is in the oversteer condition; and when the sought behavior index value exceeds the target behavior index value, it is determined that the vehicle is in the oversteer condition.

In a state where the direction of the driver's operation of the operation member is the same as the turning direction of the vehicle, when the sought behavior index value is less than the target behavior index value, the vehicle is in the understeer condition, while when the sought behavior index value exceeds the target behavior index value, the vehicle is in the oversteer condition.

However, in a state where the vehicle is in the oversteer condition, when the operation member is operated in the direction opposite the direction in which the vehicle is being turned in order to eliminate the oversteer condition, i.e., when so-called 'counter-steering' is performed, a situation arises in which the sought behavior index value is less than the target behavior index value corresponding to the amount of operation of the operation member, even though the oversteer condition is not in fact eliminated. If the braking force is applied to eliminate the understeer condition in this situation, the steering angle control performed to eliminate the oversteer condition conflicts with the braking force control performed to eliminate the understeer condition.

According to the above constitution, in a state where the sought behavior index value is less than the target behavior index value, it is determined whether the vehicle body lateral slip angle is changing so as to bring the behavior index value closer to the target behavior index value or so as to move the behavior index value away from the target behavior index value. When the vehicle is in the oversteer condition, if the sought behavior index value is less than the behavior index value corresponding to the amount of operation of the operation member due to the counter-steering operation, the vehicle body lateral slip angle changes so as to move the behavior index value away from the target behavior index value, and therefore it can be determined that the vehicle is in the oversteer condition. In this way, in a state where the counter-steering is carried out to eliminate the oversteer condition, the braking force can also be applied to eliminate the oversteer condition. Therefore, the above conflict between the steering angle control and the braking force control can be eliminated and the vehicle's behavior can be stabilized.

In the third aspect of the present invention, it is preferred that the vehicle attitude control apparatus further includes means for seeking a wheel lateral slip angle, and means for determining whether or not the size of the sought wheel lateral slip angle equals or exceeds a predetermined maximum value when the vehicle is determined to be in the understeer condition, wherein: when the sought wheel lateral slip angle equals or exceeds the predetermined maximum value, the braking force control is performed so that the sought braking force is applied, and the amount of control of the steering actuator to ensure that the behavior index value matches the target behavior index value is minimized, and when sought wheel lateral slip angle is less than the predetermined maximum value, as the sought wheel lateral slip angle decreases, the amount of the braking force control is reduced and the amount of control of the steering actuator to ensure that the behavior index value matches the target behavior index value is increased.

In this way, when the size of the wheel lateral slip angle equals or exceeds the predetermined maximum value in the understeer condition, the braking force that maximizes the vehicle yaw moment acting toward the inside of the turn acts on the inside wheels, and the amount of control of the steering actuator to ensure that the behavior index value matches the target behavior index value is minimized. Furthermore, when the size of the wheel lateral slip angle is less than the predetermined maximum value in the understeer condition, as the size of the wheel lateral slip angle becomes smaller, the amount of control of the braking force is reduced and the amount of control of the steering actuator to ensure that the behavior index value matches the target behavior index value is increased. In this way, when the vehicle is in the understeer condition, an excessive increase in the steering angle and the excessive application of braking force to the inside wheels can be prevented, thereby preventing a reduction in the yaw moment that stabilizes the vehicle's behavior. In addition, the amount of braking force for stabilizing vehicle's behavior can be increased as the vehicle's behavior becomes more unstable and the wheel lateral slip angle becomes larger, without the need for a complicated control process.

In the third and fourth aspects of the present invention, it is preferred that the vehicle attitude control apparatus includes means for determining whether at least one of the value corresponding to the size of the vehicle body lateral slip angle and the value corresponding to the size of the rate of change of the vehicle body lateral slip angle exceeds a predetermined positive number value, wherein: when neither the value corresponding to the size of the vehicle body lateral slip angle nor the value corresponding to the size of the rate of change of the vehicle body lateral slip angle exceeds the predetermined positive number value, the amount of control of the braking force and the amount of control of the steering actuator in connection with the wheel lateral slip angle are set at a fixed level regardless of the size of the sought wheel lateral slip angle.

In this way, because neither the steering angle nor the braking force fluctuates more than necessary to ensure that the behavior index value matches the target behavior index value, a deterioration in the feel of steering operation can be prevented.

In the third and fourth aspects of the present invention, it is preferred that the predetermined maximum value for the wheel lateral slip angle does not exceed the maximum value at which the linear region, in which the cornering force is proportional to the wheel lateral slip angle, is maintained.

In this way, when the vehicle is in the understeer condition, the linear region, in which the wheel lateral slip angle is proportional to the cornering force, can be maintained by prevention of an excessive increase in the steering angle, and thus unstable vehicle movement can be reliably prevented.

In the third and fourth aspects of the present invention, it is preferred that the stored equation is expressed as $$F_x = a \cdot \mu \cdot W/(r^2+a^2)^{1/2}$$

in which $F_x$ represents the braking force, W represents the tire load on each wheel, $\mu$ represents the coefficient of friction between the road and the tire of each wheel, r is sought from the relationship $r=F_O/(\mu \cdot W)$ in which $F_O$ represents the non-braking cornering force, a is sought from the relationship $d/2=a \cdot L_f$, when the braking force on the front wheel is calculated in which $L_f$ represents the distance between the front wheels and the vehicle's center of gravity and d represents the front wheel tread, and a is sought from the relationship $d/2=a \cdot L_r$, when the braking force on the rear wheels is calculated in which $L_r$ represents the distance between the rear wheels and the vehicle's center of gravity and d represents the front wheel tread.

In this way, an appropriate braking force that stabilizes the vehicle's behavior can be applied.

In the third and fourth aspects of the present invention, it is preferred that the vehicle attitude control apparatus includes means for seeking the braking force applied to each wheel, means for seeking the difference between the braking force applied to the inside wheels and the braking force applied to the outside wheels, means for calculating a steering angle set value corresponding to the sought target behavior index value and braking force difference based on a stored relationship between the target behavior index value, the braking force difference and the steering angle set value, and means for calculating a steering angle correction value corresponding to the difference between the target behavior index value and the sought behavior index value based on a stored relationship between this difference and the steering angle correction value, wherein the behavior index value is matched to the target behavior index value, by controlling the steering actuator so that the steering angle matches a target steering angle which is the sum of the steering angle set value and the steering angle correction value.

In this way, the steering actuator is controlled so that the steering angle matches the target steering angle which is the sum of the steering angle set value and the steering angle correction value. The steering angle set value corresponds to the target behavior index value corresponding to the amount of operation of the operation member and the braking force difference between the right and left wheels. The steering angle correction value corresponds to the difference between the target behavior index value and the sought behavior index value. The steering angle set value corresponds to the feed forward component of the target steering angle, and the steering angle correction value corresponds to the feedback component thereof, and therefore feed forward control and feedback control are carried out. In other words, because the steering angle set value is determined not only in accordance with the amount of operation of the operation member, but also in accordance with the braking force difference between the right and left wheels, when the vehicle's behavior is stabilized by controlling the braking force, the steering angle can be controlled by the feed forward control in accordance with the braking force difference. Therefore, the responsiveness of the control can be improved and the stabilization of vehicle behavior can be performed more effectively than when the steering angle is controlled only by the feedback control in accordance with the behavior index value obtained based on the braking force control.

According to the third aspect of the present invention, the vehicle attitude control apparatus performs integrated control of the braking force and the steering angle without any conflict between them in the understeer and oversteer conditions, with preventing the steering angle and the braking force from becoming excessively large in the understeer condition, improving the responsiveness of the control, and stabilizing the vehicle's behavior.

According to the fourth aspect of the present invention, the vehicle attitude control apparatus increases the yaw moment that stabilizes the vehicle's behavior beyond the level obtainable in the conventional art, by controlling the braking force appropriately in the understeer and oversteer conditions, with improving the responsiveness of the control, and stabilizing the vehicle's behavior by controlling the braking force and the steering angle integrally without any conflict between them.

BRIEF DESCRIPTION OF THE DRAWINGS

FIG. 4(1) is a drawing showing a vehicle experiencing lateral slipping in an oversteer condition, and FIG. 4(2) is a drawing showing a vehicle experiencing lateral slipping in an oversteer condition;

DESCRIPTION OF THE PREFERRED EMBODIMENT

Figure 1:
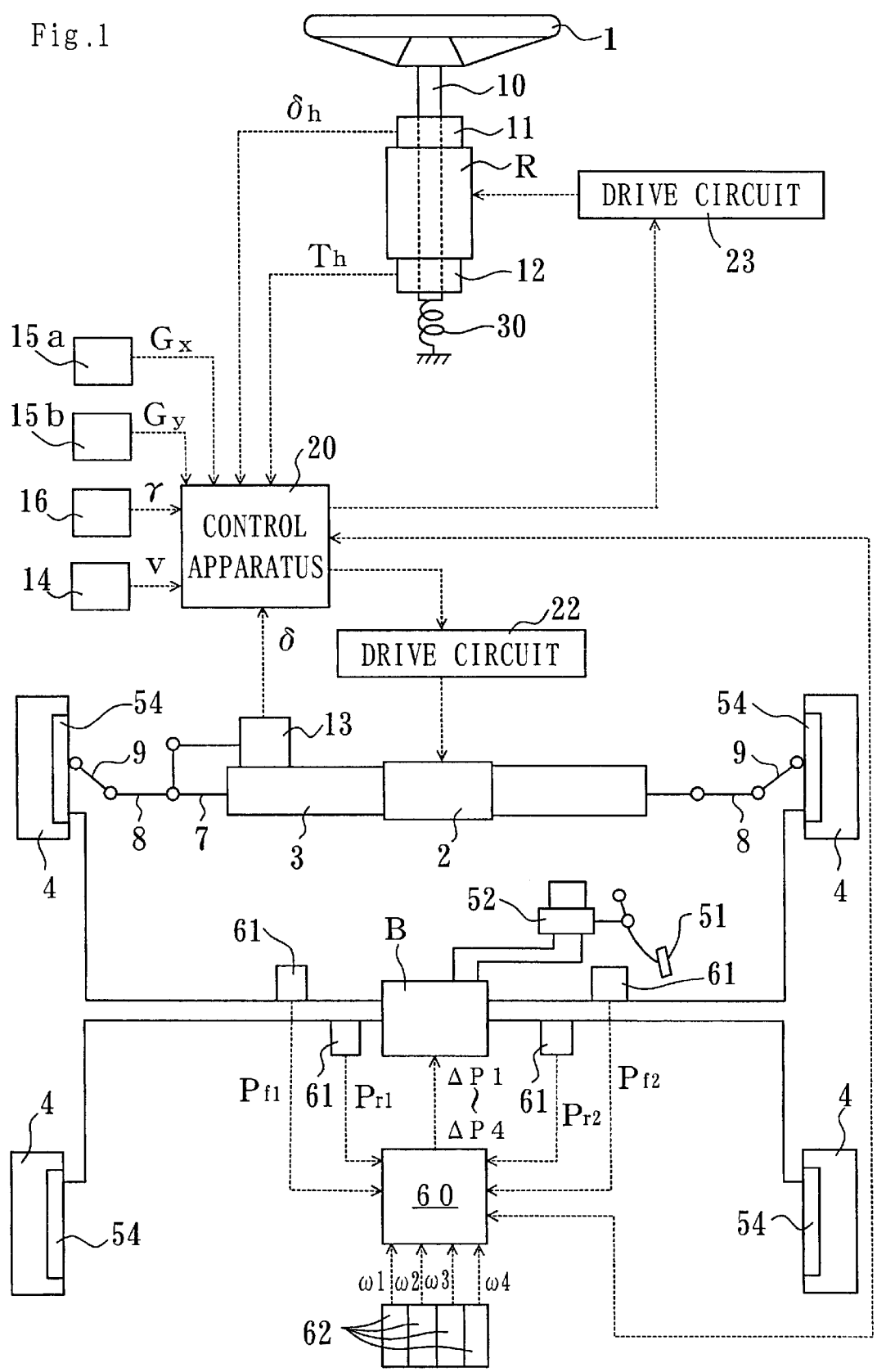
FIG. 1 is a drawing to explain the constitution of the attitude control apparatus of an embodiment of the present invention.

The vehicle attitude control apparatus shown in FIG. 1 transmits the movement of the steering actuator 2 driven in accordance with the rotational operation of the steering wheel (operation member) 1 to the front right and left wheels 4 via steering gears 3 without a mechanical connection between the steering wheel 1 and the wheels 4, so that the steering angle changes.

As the steering actuator 2, an electrical motor such as a known brushless motor can be used. The steering gear 3 has a motion conversion mechanism that converts the rotational movement of the output shaft of the steering actuator 2 into the linear motion of the steering rod 7. The motion of this steering rod 7 is transmitted to the wheels 4 via tie rods 8 and knuckle arms 9. As the steering gear 3, a known steering gear can be used as long as the steering angle is changed by the movement of the steering actuator 2. For example, the steering gear can be comprised of a nut, that is driven to rotate by the output of the steering actuator 2, and a screw shaft, that is screwed into this nut and is integrally formed with the steering rod 7. Furthermore, the wheel alignment is set such that when the actuator 2 is not being driven, the wheels 4 can return to the straight-ahead steering positions by self-aligning torque.

The steering wheel 1 is connected to a rotation shaft 10 that is rotatably supported by the vehicle body. An operation actuator R that applies torque to the rotation shaft 10 is used in order to provide the counter-force required to operate the steering wheel 1. As the operation actuator R, an electrical motor such as a brushless motor having an output shaft integrally formed with the rotation shaft 10 can be used.

A elastic member 30 applies elastic force in the direction in which the steering wheel 1 is induced to return to the straight-ahead steering position. As the elastic member 30, for example, a spring that applies elastic force to the output shaft 10 can be used. When the operation actuator R is not applying torque to the rotation shaft 10, this elastic force operates to return the steering wheel 1 to the straight-ahead steering position.

An angle detection sensor 11, which detects the angle of operation corresponding to the rotational angle of the rotation shaft 10 as the amount of operation of the steering wheel 1, is provided. A torque sensor 12, which detects the operating torque of the steering wheel 1, is provided. The steering direction can be determined from the sign of the torque detected by the torque sensor 12.

A steering angle sensor 13, which detects the amount of movement of the steering rod 7 as the steering angle of the vehicle, is provided. As the steering angle sensor 13, a potentiometer can be used.

The angle sensor 11, the torque sensor 12 and the steering angle sensor 13 are connected to a steering system control apparatus 20 constituted of a computer. A speed sensor 14 that detects the vehicle speed, a longitudinal acceleration sensor 15a that detects the longitudinal acceleration of the vehicle, a lateral acceleration sensor 15b that detects the lateral acceleration of the vehicle, and a yaw rate sensor 16 that detects the yaw rate of the vehicle are connected to the control apparatus 20. The control apparatus 20 controls the steering actuator 2 and the operation actuator R via drive circuits 22 and 23. In this embodiment, the yaw rate sought via the yaw rate sensor 16 is deemed a behavior index value corresponding to the change in the vehicle's behavior that occurs based on the change in the steering angle.

A hydraulic braking system, which performs the braking of the front and rear, and left and right wheels 4 of the vehicle, is provided. This braking system generates via a master cylinder 52 brake pressure on each wheel 4 in accordance with the foot pressure exerted on the brake pedal 51. This brake pressure is amplified by a brake pressure control unit B and distributed to the brake device 54 of each wheel 4 as wheel cylinder pressure, and each brake device 54 applies braking force to its respective wheel 4. The brake pressure control unit B is connected to a driving system control apparatus 60 constituted of a computer. The steering system control apparatus 20, brake pressure sensors 61 that individually detect the wheel cylinder pressure for each of the wheels 4, and wheel speed sensors 62 that individually detect the rotation speed of each of the wheels 4 are connected to the driving system control apparatus 60. The driving system control apparatus 60 controls the brake pressure control unit B so that the brake pressure can be amplified and distributed in accordance with the rotation speed of each wheel 4 and the wheel cylinder pressure. The speed of each wheel 4 is detected by each wheel speed sensor 62, and the wheel cylinder pressure corresponds to the braking force feedback value detected by the brake pressure sensor 61. In this way, individual control of the braking force applied to the four wheels 4 can be performed. The brake pressure control unit B can generate brake pressure in accordance with signals from the driving system control apparatus 60 by using a built-in pump, even when the brake pedal 51 is not operated.

Figure 2:
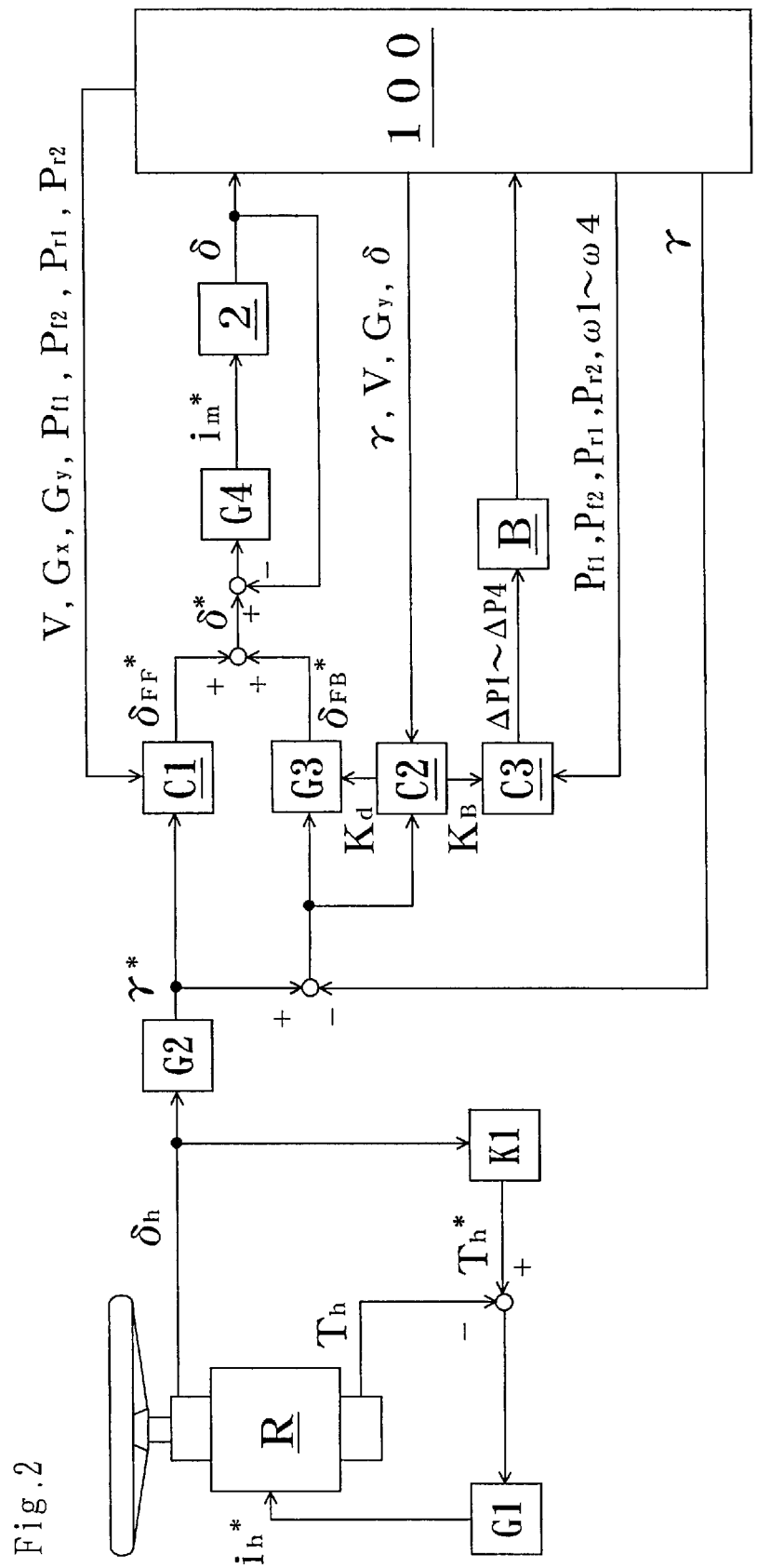
FIG. 2 is a control block diagram of the attitude control apparatus of the embodiment of the present invention.

FIG. 2 is a control block diagram of the above attitude control apparatus. In the explanation below, the symbols have the following meanings.

m: mass of vehicle
$h_g$: height of vehicle center of gravity
W: tire load on each wheel
$\mu$: coefficient of friction between tire and road surface
L: wheelbase
$L_f$: distance between front wheels and vehicle center of gravity
$L_r$: distance between rear wheels and vehicle center of gravity
d: tread
V: vehicle speed
$\omega 1, \omega 2, \omega 3, \omega 4$: wheel speed
$G_X$: longitudinal acceleration
$G_Y$: lateral acceleration
A': stability factor during braking
$I_Z$: vehicle inertial moment
$T_h$: operation torque $T_h^*$: target operation torque
$\gamma$: yaw rate
$\gamma^*$: target yaw rate
dr/dt: yaw rate differential
M: yaw moment
$M_{max}$: maximum yaw moment
$\delta_h$: operation angle
$\delta$: front wheel steering angle
$\delta^*$: target steering angle
$\delta_{FF}^*$: steering angle set value
$\delta_{FB}^*$: steering angle correction value
$\beta$: vehicle body lateral slip angle
$d\beta/dt$: vehicle body lateral slip angle speed
$\beta_f$: front wheel lateral slip angle
$\beta_{fmax}$: front wheel lateral slip angle at maximum lateral force
$\beta_r$: rear wheel lateral slip angle
$\beta_{rmax}$: rear wheel lateral slip angle at maximum lateral force
$F_y$: cornering force
$F_o$: non-braking cornering force
$F_{f1}$: left front wheel cornering force
$F_{f2}$: right front wheel cornering force
$F_{r1}$: left rear wheel cornering force
$F_{r2}$: right rear wheel cornering force
$K_{fo}$: single-wheel non-braking front wheel cornering power
$K_{ro}$: single-wheel non-braking rear wheel cornering power
$K_f$: non-braking total front wheel cornering power
$K_r$: non-braking total rear wheel cornering power
$K_{f1}$: braking left front wheel cornering power
$K_{f2}$: braking right front wheel cornering power
$K_{r1}$: braking left rear wheel cornering power
$K_{r2}$: braking right rear wheel cornering power
$F_X$: braking force
$B_d$: braking force difference between right and left wheels
$F_{Xf1}$: left front wheel braking force
$F_{Xf2}$: right front wheel braking force
$F_{Xr1}$: left rear wheel braking force
$F_{Xr2}$: right rear wheel braking force
$\Delta P1, \Delta P2, \Delta P3, \Delta P4$: instructed brake pressure
$P_f$: front wheel lock pressure under static load
$P_r$: rear wheel lock pressure under static load
$P_{f1}$: left front wheel cylinder pressure
$P_{f2}$: right front wheel cylinder pressure
$P_{r1}$: left rear wheel cylinder pressure
$P_{r2}$: right rear wheel cylinder pressure
$K_B$: braking force control gain
$K_{Bmax}$: maximum braking force control gain
$K_d$: front wheel steering angle control gain
$K_{dmax}$: maximum front wheel steering angle control gain
$i_m^*$: target drive current for steering actuator 2
$i_h^*$: target drive current for steering actuator R In FIG. 2, K1 is the gain of the target operation torque $T_h^*$ relative to the operation angle $\delta_h$, and the target operation torque $T_h^*$ is calculated from the relationship $T_h^*=K1 \cdot \delta_h$ and from the operation angle $\delta_h$ detected by the angle sensor 11. In other words, the control apparatus 20 stores the gain K1 expressing the stored relationship between the target operation torque $T_h^*$ and the operation angle $\delta h$, and calculates the target operation torque $T_h^*$ based on that relationship and on the detected operation angle $\delta_h$. K1 is set so that appropriate control is performed. It is also acceptable to use the operation torque $T_h$ in place of the operation angle $\delta_h$, so that the relationship between the target operation torque $T_h^*$ and the operation torque $T_h$ is predetermined and stored, and the target operation torque $T_h^*$ is calculated from this relationship and the operation torque $T_h$.

G1 is the transfer function of the target drive current $i_h^*$ of the operation actuator R relative to the difference between the target operation torque $T_h^*$ and the operation torque $T_h$.

The control apparatus 20 calculates the target drive current $i_h^*$ from the predetermined and stored relationship $i_h^* = G1 \cdot (T_h^* - T_h)$, the calculated target operation torque $T_h^*$, and the operation torque $T_h$ detected by the torque sensor 12. When PI (proportional integral) control is carried out, for example, the transfer function G1 is expressed as $G1 = K2[1 + 1/(\tau a \cdot s)]$, where K2 represents the gain, s represents a Laplace operator, and $\tau a$ indicates a time constant. The gain K2 and the time constant $\tau a$ are adjusted so that the optimal control can be carried out. In other words, the control apparatus 20 stores the transfer function G1 that expresses the stored relationship between the difference obtained by subtracting the detected operation torque $T_h$ from the target operation torque $T_h^*$ and the target drive current $i_h^*$, and it calculates the target drive current $i_h^*$ in accordance with the calculated target operation torque $T_h^*$ and the detected operation torque $T_h$ based on this relationship. The operation actuator R is driven in accordance with this target drive current $i_h^*$.

G2 is the transfer function of the target yaw rate $\gamma^*$ corresponding to the target behavior index value relative to the operation angle $\delta_h$ of the steering wheel 1. The control apparatus 20 calculates the target yaw rate $\gamma^*$ from the stored relationship $\gamma^* = G2 \cdot \delta_h$ and the operation angle $\delta_h$ detected by the angle sensor 11. When first-order lag control is performed, for example, the transfer function G2 is expressed as $G2 = k3/(1 + \tau b \cdot s)$, where s indicates a Laplace operator, K3 indicates the steady gain of the target yaw rate $\gamma^*$ relative to the operation angle $\delta_h$, and $\tau b$ indicates the first-order lag time constant of the target yaw rate $\gamma^*$ relative to the operation angle $\delta_h$. The gain K3 and the time constant $\tau b$ are adjusted so that optimal control is carried out. In other words, the control apparatus 20 stores the transfer function G2 that expresses the predetermined relationship between the detected operation angle $\delta_h$ and the target yaw rate $\gamma^*$, and it seeks the target yaw rate $\gamma^*$ in accordance with the detected operation angle $\delta_h$ based on this relationship.

It is acceptable to make the gain K3 a function of the vehicle speed V, so that the gain K3 is reduced as the vehicle speed V increases in order to preserve stability at high speeds.

C1 indicates a calculating block of the control apparatus 20, in which the steering angle set value $\delta_{FF}^*$ is calculated, based on the predetermined and stored relationship between the target yaw rate, the braking force difference and the steering angle set value. The steering angle set value $\delta_{FF}^*$ corresponds to the target yaw rate $\gamma^*$ calculated in accordance with the sought amount of operation of the steering wheel 1 and the braking force difference $B_d$ between the braking force on the inside wheels and the braking force on the outside wheels. This predetermined and stored relationship is sought based on the vehicle's equations of motion.

In this embodiment, in order to reconcile the needs of responsiveness and stability of control, these equations of motion are deemed the following equations (1) and (2), which closely approximate the motion of a vehicle having two degrees of freedom of lateral movement and yaw movement on a plane.

$$m \cdot V \cdot (d\beta/dt + \gamma) = F_{f1} + F_{f2} + F_{r1} + F_{r2} \tag{1}$$

$$I_z \cdot d\gamma/dt = L_f(F_{f1} + F_{f2}) - L_r(F_{r1} + F_{r2}) + d/2 \cdot B_d \tag{2}$$

Here, $B_d$ is the braking force difference between the braking force applied to the left wheels and the braking force applied to the right wheels, and is expressed in the equation (3) below. The wheel braking forces $F_{Xf1}, F_{Xf2}, F_{Xr1}$ and $F_{Xr2}$ respectively correspond to the wheel cylinder pressures $P_{f1}$, $P_{f2}$, $P_{r1}$ and $P_{r2}$ detected by the brake pressure sensors 61, and this relationship of correspondence is predetermined and stored in the control apparatus. The wheel braking forces $F_{Xf1}, F_{Xf2}, F_{Xr1}$ and $F_{Xr2}$ are sought by the control apparatus 20 from this stored relationship and from the detected wheel cylinder pressures $P_{f1}$, $P_{f2}$, $P_{r1}$ and $P_{r2}$.

$$B_d = F_{Xf1} + F_{Xr1} - F_{Xf2} - F_{Xr2} \tag{3}$$

Figure 10:
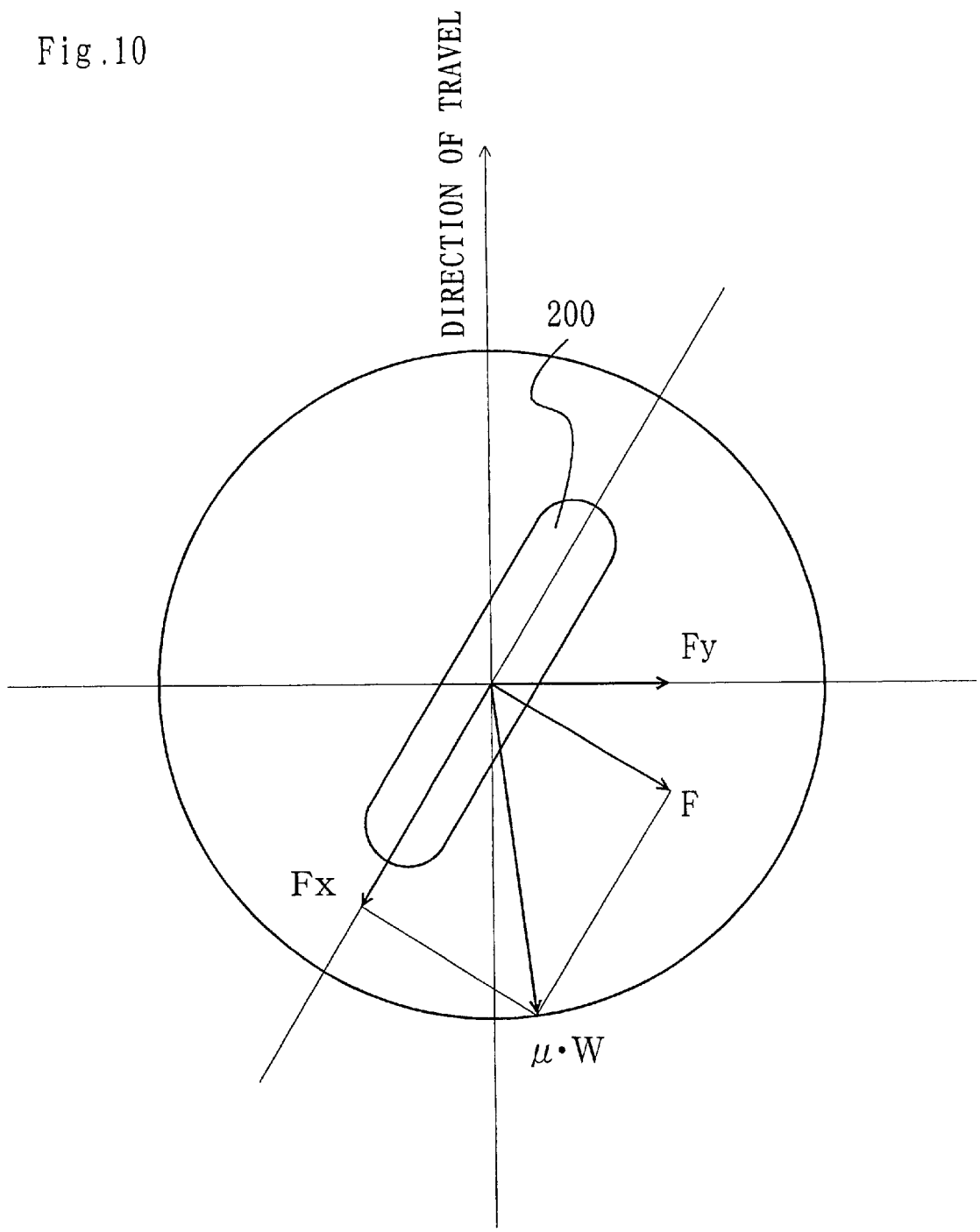
FIG. 10 is a drawing showing forces that acts due to friction between the tire and road surface.

When the friction force $\mu \cdot W$, which acts on the tire due to the friction between the tire and the road surface in each wheel 4, comprises the combined force of the braking force $F_X$ and lateral force F applied to the tire. The force $\mu \cdot W$ due to the friction between the tire and the road surface does not exceed the radius of the friction circle. In other words, as shown in FIG. 10, where the coefficient of friction between the tire 200 and the road surface is $\mu$ and the weight of the vehicle acting on the tire 200 is W, the friction force $\mu \cdot W$ acts on the tire 200 in the horizontal direction due to the friction between the tire 200 and the road surface. The circle having a radius defined by the friction force $\mu \cdot W$ is called the friction circle. When the braking force $F_X$ acts on the tire 200, if the braking force $F_X$ and the lateral force F are assumed to be the only forces acting on the tire 200 as a result of the friction between the tire 200 and the road surface, the combined force of the braking force $F_X$ and lateral force F corresponds to the friction force $\mu \cdot W$. The force due to the friction between the tire 200 and the road surface does not exceed $\mu \cdot W$ which is the radius of the friction circle. Therefore, when the braking force $F_X$ increases, because the lateral force F decreases, the cornering force $F_y$, which is the orthogonal component of the lateral force F relative to the direction in which the tire proceeds, decreases.

Therefore, the relationship between the friction force $\mu \cdot W$, the cornering force $F_y$, and the non-braking cornering force $F_O$ is expressed through the following binding equation (4).

$$\{F_X/(\mu \cdot W)\}^2 + (F_y/F_o)^2 = 1 \tag{4}$$

The relationship between, for example, the vehicle speed, the wheel speed and the road surface coefficient of friction is predetermined and stored in the control apparatus 20, and the road surface coefficient of friction $\mu$ is sought from the relationship, the vehicle speed V detected by the speed sensor 14, and the wheel speeds $\omega_1$ through $\omega_4$ detected by the wheel speed sensors 62.

Figure 3:
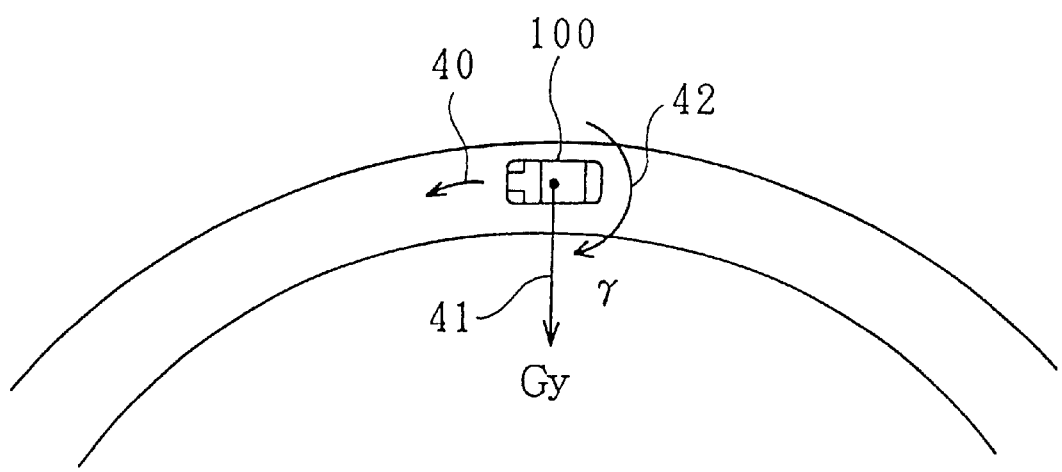
FIG. 3 is a drawing showing the state of the vehicle when it is making a steady circular turn.

In FIG. 3, when the vehicle 100 is assumed to be executing a steady circular turn in the direction indicated by the arrow 40 at speed V, the relationship between the lateral acceleration $G_Y$ acting on the vehicle 100 in the direction indicated by the arrow 41 and the yaw rate $\gamma$ acting on the vehicle 100 in the direction indicated by the arrow 42 is approximated by the equation $\gamma = G_Y/V$. Moreover, in a vehicle 100 subject to lateral slipping in an oversteer condition as shown in FIG. 4(1), or a vehicle 100 subject to lateral slipping in an understeer condition as shown in FIG. 4(2), the angle formed between the central axis of the vehicle body, which is indicated by a one-dot chain line, and the direction in which the vehicle 100 moves, which is indicated by a dashed line, is deemed vehicle body lateral slip angle $\beta$. Because the rate of change $d\beta/dt$ of the vehicle body lateral slip angle $\beta$ is approximated by $(G_Y/V - \gamma)$, the vehicle body lateral slip angle $\beta$ is sought through the time integral value of $(G_Y/V - \gamma)$ as shown in the equation (5) below.

$$\beta = \int (d\beta/dt) dt = \int (GY/V - \gamma) dt \tag{5}$$

In other words, values including the yaw rate $\gamma$ which is the above behavior index value, in this embodiment the yaw rate γ, the lateral acceleration $G_y$, and the vehicle speed V, are detected as values correlated to the vehicle body lateral slip angle β. The equation (5) that expresses the relationship between the values $G_Y$, V and γ, that correlate to the vehicle body lateral slip angle β, and the vehicle body lateral slip angle β is stored in the control apparatus 20. The control apparatus 20 seeks the vehicle body lateral slip angle β in time series based on this relationship and on the detected values correlated to the vehicle body lateral slip angle β.

The front wheel lateral slip angle $β_f$ and the rear wheel lateral slip angle $β_r$ are sought from the vehicle body lateral slip angle β, the distance $L_f$ between front wheels and vehicle center of gravity, the distance $L_r$ between rear wheels and vehicle center of gravity, the vehicle speed V and the front wheel steering angle δ with using the equations (6) and (7) below.

$$β_f = β + L_f γ/V - δ \tag{6}$$

$$β_r = β - L_r γ/V \tag{7}$$

In other words, the vehicle body lateral slip angle β is sought as a value correlated to wheel lateral slip angles $β_f$ and $β_r$. Again, the values including the yaw rate γ that is the behavior index value, in this embodiment the yaw rate γ, the vehicle speed V, and the steering angle δ, are detected. The predetermined equations (6) and (7), which express the relationships between the values (β, V, r, and δ) correlated to the wheel lateral slip angles ($β_f$ and $β_r$) and the wheel lateral slip angles ($β_f$ and $β_r$), are stored in the control apparatus 20. The control apparatus 20 seeks the wheel lateral slip angles $β_f$ and $β_r$ based on these relationships and values correlated to the wheel lateral slip angles $β_f$ and $β_r$.

If it is hypothesized that the longitudinal acceleration $G_X$ and the lateral acceleration $G_Y$ are proportional to the amount of shift of the center of gravity load, the tire load W and road surface coefficient of friction μ are proportional to the cornering power, and the wheel cylinder pressure is proportional to the braking force, the following equations (8) through (11) are derived based on the above equation (4).

$$F_{f1} = -K_{f1} \cdot (β + L_f γ/V - δ) \tag{8}$$

$$F_{f2} = -K_{f2} \cdot (β + L_f γ/V - δ) \tag{9}$$

$$F_{r1} = -K_{r1} \cdot (β - L_r γ/V) \tag{10}$$

$$F_{r2} = -K_{r2} \cdot (β - L_r γ/V) \tag{11}$$

Here, the cornering power $K_{f1}$, $K_{f2}$, $K_{r1}$ and $K_{r2}$ of each wheel when braking is being performed is sought from the following equations (12) through (15).

$$K_{f1} = \mu \cdot K_{fo} \cdot [\{1 - (G_X/2L + G_Y/2d) \cdot h_g\}^2 - (P_{f1}/\mu \cdot P_f)^2]^{1/2} \tag{12}$$

$$K_{f2} = \mu \cdot K_{fo} \cdot [\{1 - (G_X/2L - G_Y/2d) \cdot h_g\}^2 - (P_{f2}/\mu \cdot P_f)^2]^{1/2} \tag{13}$$

$$K_{r1} = \mu \cdot K_{ro} \cdot [\{1 + (G_X/2L - G_Y/2d) \cdot h_g\}^2 - (P_{r1}/\mu \cdot P_r)^2]^{1/2} \tag{14}$$

$$K_{r2} = \mu \cdot K_{ro} \cdot [\{1 + (G_X/2L + G_Y/2d) \cdot h_g\}^2 - (P_{r2}/\mu \cdot P_r)^2]^{1/2} \tag{15}$$

If $K_{f1} + K_{f2} = K_f$, and $K_{r1} + K_{r2} = K_r$, then the following equations (16) and (17) are derived from the above equations (8) through (11).

$$F_{f1} + F_{f2} = -(K_{f1} + K_{f2}) \cdot (β + L_f γ/V - δ) = -2K_f (β + L_f γ/V - δ) \tag{16}$$

$$F_{r1} + F_{r2} = -(K_{r1} + K_{r2}) \cdot (β - L_r γ/V) = -2K_r \cdot (β - L_r γ/V) \tag{17}$$

From the equations (1), (2), (16) and (17), the yaw rate γ relative to the front wheel steering angle δ when braking is being performed is determined with using the following equation (18).

$$γ = G_t \cdot \{(1 + T_t \cdot s) \cdot δ + G_b \cdot (1 + T_b \cdot s) \cdot B_d\}/P(s) \tag{18}$$

In this equation (18), the symbols P(s), $G_t$, $T_t$, $G_b$ and $T_b$ represent values expressed in the following equations (19) through (23).

$$P(s) = 1 + 2ζ \cdot s/ω + s^2/ω^2 \tag{19}$$

$$G_t = V/\{(1 + A' \cdot V^2) \cdot L\} \tag{20}$$

$$T_t = m \cdot L_f V/(2L \cdot K_r) \tag{21}$$

$$G_b = d \cdot (K_f + K_r)/(4L \cdot K_f K_r) \tag{22}$$

$$T_b = m \cdot V/2(K_f + K_r) \tag{23}$$

Here, the stability factor A' when braking is performed, as used in the equation (20), is defined in the equation (24) below, and the symbols ω and ζ used in the equation (19) are defined in the equations (25) and (26) below.

$$A' = m \cdot (L_r \cdot K_r - L_f K_f)/2L^2 \cdot K_f K_r \tag{24}$$

$$ω = 2L \cdot \{K_f K_r \cdot (1 + A' \cdot V^2)/m \cdot I_Z\}^{1/2}/V \tag{25}$$

$$ζ = \{m \cdot (L_f^2 \cdot K_f + L_r^2 \cdot K_r) + I_Z \cdot (K_f + K_r)\}/ [2L \cdot \{m \cdot I_Z \cdot K_f K_r \cdot (1 + A' \cdot V^2)\}^{1/2}] \tag{26}$$

If the yaw rate γ in equation (18) is deemed equivalent to the target yaw rate γ* sought based on the transfer function $G2 = K3/(1 + τb \cdot s)$, and δ in equation (18) is deemed equivalent to the steering angle set value $δ_{FF}*$, the steering angle set value $δ_{FF}*$, which is used in order to make the target yaw rate γ* correspond with the operation angle $δ_h$ and the braking force difference $B_d$ by feed forward control, is sought with using the following equation (27)

$$δ_{FF}* = K3 \cdot P(s) \cdot δ_h/\{G_t \cdot (1 + τb \cdot s) \cdot (1 + T_t \cdot s)\} - G_b \cdot B_d \cdot (1 + T_b \cdot s)/(1 + T_t \cdot s) \tag{27}$$

C2 indicates a calculating block in the control apparatus 20, in which the front wheel steering angle gain $K_d$ and the braking force control gain $K_B$ for controlling the front wheel steering angle and the braking force are calculated, in accordance with the difference between the target yaw rate γ* and the actual yaw rate γ of the vehicle 100 detected by the yaw rate sensor 16. Through this calculation, the ratio between the front wheel steering angle control and the braking control in the vehicle attitude control is determined, when the vehicle is in the understeer condition. In this way, the cooperative control is performed, wherein the ratio of front wheel steering angle control is increased in the linear region in which the tire lateral slip angle and the cornering force have a proportional relationship, while the ratio of the braking force control is increased as it approaches the saturation region in which the cornering force does not change even where the tire lateral slip angle changes due to changes in the driving conditions and the road conditions.

Therefore, in the calculating block C2, the vehicle body lateral slip angle β and the front wheel lateral slip angle $β_f$ are calculated with using the equations (5) and (6). Alternatively, it is acceptable that the rear wheel lateral slip angle $β_r$ instead of the front wheel lateral slip angle $β_f$, is calculated by the equation (7). Next, in order to determine whether or not the cooperative control is to be performed, it is determined whether either the value corresponding to the size of the vehicle body lateral slip angle β, or the value corresponding to the rate of change of the vehicle body lateral slip angle β, or both, exceeds a predetermined positive number value. In this embodiment, when the absolute value of the vehicle body lateral slip angle β, which corresponds to the size of the vehicle body lateral slip angle β, is equal to or less than a predetermined integer value 1/Ca, and the absolute value of the vehicle body lateral slip angle speed dβ/dt, which corresponds to the rate of change of the vehicle body lateral slip angle, is equal to or less than a predetermined integer value 1/Cb, the amount of control of the braking force and the amount of control of the steering actuator 2 relative to the wheel lateral slip angle are set to a constant value. In this case the cooperative control is not carried out regardless of the size of the sought wheel lateral slip angle, which is the front wheel lateral slip angle $β_f$ or the rear wheel lateral slip angle $β_r$.

In this embodiment, a determination coefficient J used to determine whether or not the cooperative control is to be carried out is calculated with using the following equation (28), and it is determined whether or not the absolute value of the determination coefficient J exceeds 1.

$$J = Ca \cdot β + Cb \cdot dβ/dt \quad (28)$$

Figure 5:
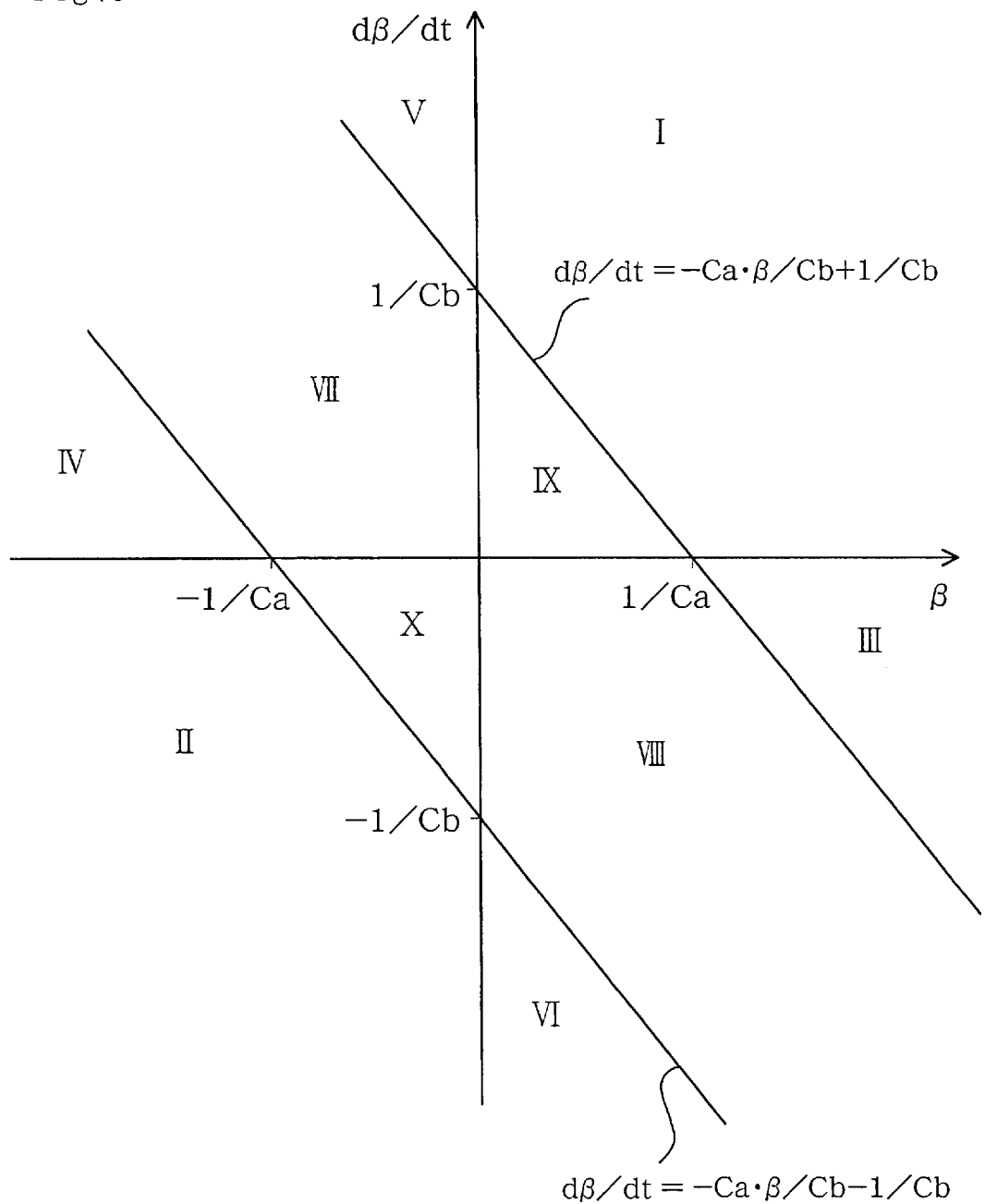
FIG. 5 is a graph showing the relationship between the vehicle body lateral slip angle and the vehicle body lateral slip angle speed in the embodiment of the present invention.

In the above equation, Ca and Cb are positive numbers, and are predetermined in accordance with the need for the cooperative control of the steering angle and the braking force. When the absolute value of the determination coefficient J exceeds 1, the relationship between the vehicle body lateral slip angle β and the vehicle body lateral slip angle speed dβ/dt is indicated by regions I through VI in FIG. 5. In other words, because the absolute value indicating the size of the vehicle body lateral slip angle β is in an increasing state in regions I and II, the absolute value of the vehicle body lateral slip angle β is larger than the absolute value of 1/Ca in regions III and IV, and the absolute value of the vehicle body lateral slip angle speed dβ/dt is larger than the absolute value of 1/Cb in regions V and VI, it is determined that the cooperative control of the steering angle and the braking force is necessary. In this embodiment, the lateral slip angle is deemed positive when it directs the vehicle toward the inside of the turn, and is deemed negative when it directs the vehicle toward the outside of the turn. When the absolute value of the determination coefficient J does not exceed 1, because the absolute value of the vehicle body lateral slip angle β is in a declining state in the regions VII and VIII, the absolute value of the vehicle body lateral slip angle β does not exceed the absolute value of 1/Ca in the regions IX and X, and the absolute value of the vehicle body lateral slip angle speed dβ/dt does not exceed the absolute value of 1/Cb, it is determined that the cooperative control of the steering angle and the braking force is not necessary.

When it is determined that the cooperative control of the steering angle and the braking force is necessary, it is determined in the calculating block C2, based on at least the yaw rate γ which is the detected behavior index value and the target yaw rate γ* which is the sought target behavior index value, whether the vehicle is in the understeer condition or the oversteer condition.

In other words, in a state where the driver is operating the steering wheel 1 in the direction of turning, when the sought yaw rate γ is less than the target yaw rate γ*, the vehicle is in the understeer condition. When the sought vehicle body lateral slip angle β is changing such that the sought yaw rate γ is less than the target yaw rate γ* and the yaw rate γ is moving away from the target yaw rate γ*, it is determined that the vehicle is in the understeer condition.

When the sought yaw rate γ exceeds the target yaw rate γ*, it is determined that the vehicle is in the oversteer condition.

In order to perform this determination, first, $δ \cdot (γ^* - γ)$ and $δ \cdot dβ/dt$ are sought, and it is determined whether or not $δ \cdot (γ^* - γ)$ and $γ \cdot dβ/dt$ are positive numbers. If $δ \cdot (γ^* - γ)$ and $δ \cdot dβ/dt$ are positive numbers, the actual yaw rate γ acting on the vehicle 100 is less than the target yaw rate γ*, and the absolute value of the vehicle body slip angle β is increasing, and therefore it is determined that the vehicle 100 is in the understeer condition. When $δ \cdot (γ^* - γ)$ is negative, or when $δ \cdot (γ^* - γ)$ is positive and $δ \cdot dβ/dt$ is negative, it is determined that the vehicle 100 is in the oversteer condition.

If it is determined that the vehicle 100 is in the understeer condition, in the calculating block C2, it is determined whether or not the size of the front wheel lateral slip angle $β_f$ equals or exceeds a predetermined maximum value. In this embodiment, this predetermined maximum value is deemed the maximum wheel lateral slip angle at which the linear region, in which the tire lateral slip angle is proportional to the cornering force, is maintained, i.e., is deemed the front wheel lateral slip angle $β_{fmax}$ at the maximum lateral force. Because the sign of this front wheel lateral slip angle $β_f$ changes depending on whether it direct the vehicle toward the inside of the turn or the outside of the turn, it is determined whether or not the absolute value corresponding to the size of the front wheel lateral slip angle $β_f$ equals or exceeds the front wheel lateral slip angle $β_{fmax}$ at the maximum lateral force. Any predetermined maximum value is acceptable so long as it does not exceed the maximum value of the wheel lateral slip angle at which the linear region, in which the tire lateral slip angle is proportional to the cornering force, is maintained.

Figure 6:
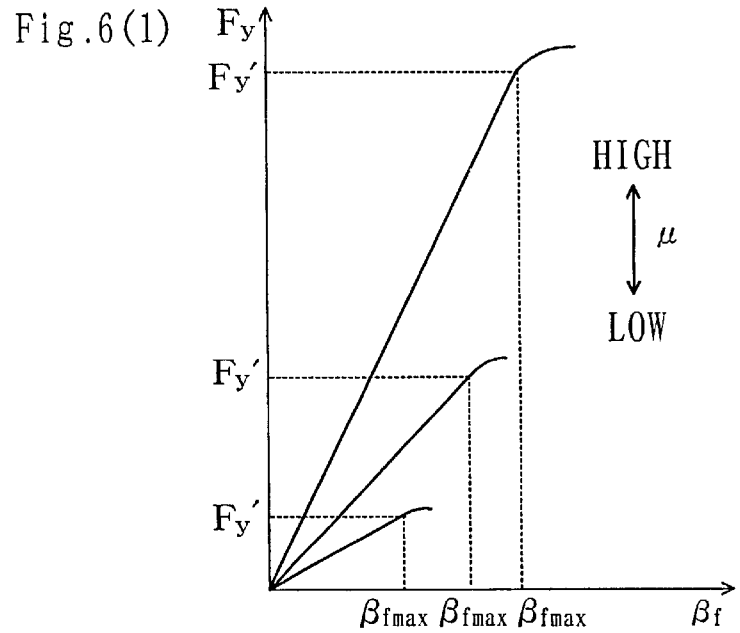
FIG. 6(1) is a graph showing the relationship between the front wheel lateral slip angle and the cornering force in the embodiment of the present invention, FIG. 6(2) is a graph showing the relationship between the front wheel steering angle control gain $K_d$ and the absolute value of the front wheel lateral slip angle $\beta_f$ in the embodiment of the present invention, and FIG. 6(3) is a chart showing the relationship between the braking force control gain $K_B$ and the absolute value of the front wheel lateral slip angle $\beta_f$ in the embodiment of the present invention.
Figure 6:
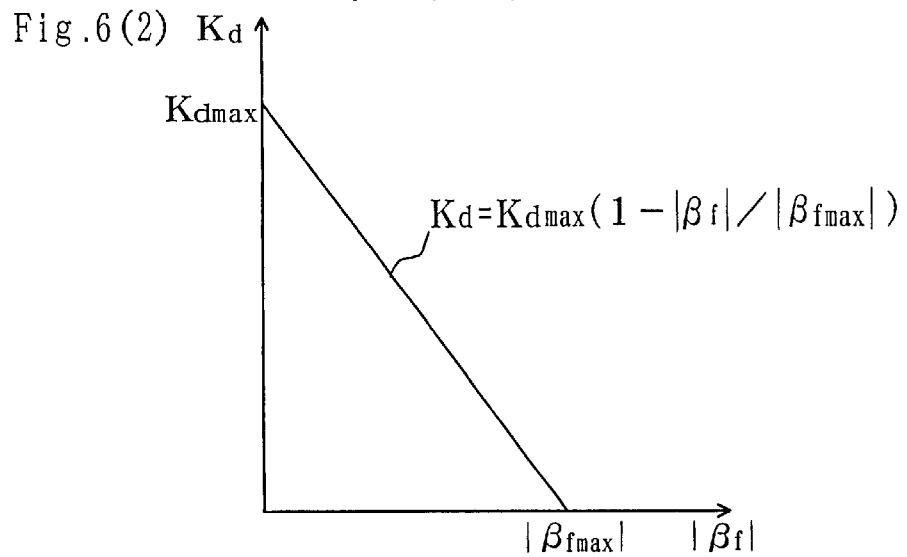
Figure 6:
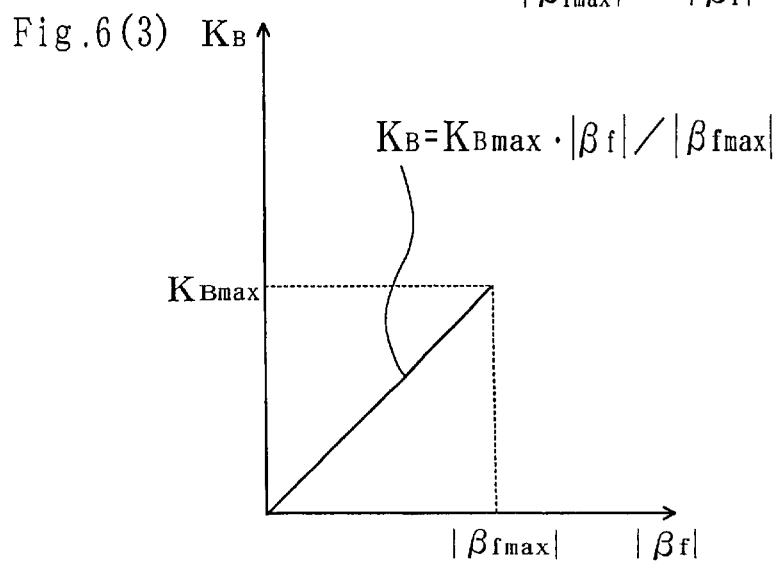

The front wheel lateral slip angle $β_f$ is correlated with the coefficient of friction μ between the tire and the road surface, and as shown in FIG. 6(1), the front wheel lateral slip angle $β_{fmax}$ at the time when the cornering force $F_y'$ corresponds to the maximum lateral force increases as the coefficient of friction μ increases. The $β_{fmax}$ can be sought based on this relationship, and can be approximated through the equation (29) below, for example.

$$\tan(β_{fmax}) = 3μ \cdot W/K_f \quad (29)$$

When the absolute value of the sought front wheel lateral slip angle $β_f$ equals or exceeds $β_{fmax}$, the front wheel steering angle control gain $K_d$ is set to zero, and the braking force control gain $K_B$ is set to the maximum value $K_{Bmax}$. Because the steering angle correction value $δ_{FB}^*$ described below is set to zero by setting the front wheel steering angle control gain $K_d$ to zero, the amount of control of the steering actuator 2 needed to make the yaw rate γ match the target yaw rate γ* is minimized. By setting the braking force control gain $K_B$ to the maximum value $K_{Bmax}$, the braking force is controlled such that the value $F_X$ sought by the equation (36) below acts as the braking force.

When the absolute value of the front wheel lateral slip angle $β_f$ is less than $β_{fmax}$, the ratio of the front wheel steering angle control gain $K_d$ relative to the braking force control gain $K_B$ is reduced as the front wheel lateral slip angle $β_f$ increases. In this embodiment, the front wheel steering angle control gain $K_d$ is calculated by the equation (30) below, and the braking force control gain $K_B$ is calculated by the equation (31) below.

$$K_d = K_{dmax} \cdot (1 - β_f^2/β_{fmax}^2) \quad (30)$$

$$K_B = K_{Bmax} \cdot β_f^2/β_{fmax}^2 \quad (31)$$

The maximum value $K_{dmax}$ of the front wheel steering angle control gain $K_d$ and the maximum value $K_{Bmax}$ of the braking force control gain $K_B$ are set appropriately in accordance with the vehicle parameters.

In this way, when the absolute value of the front wheel lateral slip angle $\beta_f$ is less than $\beta_{max}$, the amount of control of the steering angle and braking force can be changed in accordance with changes in the sought front wheel lateral slip angle $\beta_f$. In other words, as the sought front wheel lateral slip angle $\beta_f$ becomes smaller, the amount of control of the braking force $F_x$ sought through equation (36) is reduced and the amount of control of the steering actuator 2 to make the yaw rate $\gamma$ match the target yaw rate $\gamma^*$ increases.

Because these equations (30) and (31) are only examples, and therefore it is acceptable if the ratio of the front wheel steering angle control gain $K_d$ relative to the braking force control gain $K_B$ becomes smaller as the front wheel lateral slip angle $\beta_f$ increases, in the equations (30) and (31), the absolute value of $\beta_f$ can be used instead of the value $\beta_f^2$, and $\beta_{fmax}$ can be used instead of $\beta_{fmax}^2$, for example. In this case, the relationship between the front wheel steering angle control gain $K_d$ and the absolute value of the front wheel lateral slip angle $\beta_f$ is as shown in FIG. 6(2), and the relationship between the braking force control gain $K_B$ and the absolute value of the front wheel lateral slip angle $\beta_f$ is as shown in FIG. 6(3). In addition, $\beta_r$ and $\beta_{rmax}$ can be used instead of $\beta_f$ and $\beta_{frmax}$ in equations (30) and (31) and FIGS. 6(2) and 6(3).

G3 is a transfer function of the steering angle correction value $\delta_{FB}^*$ relative to the difference $(\gamma^*-\gamma)$ between the calculated target yaw rate $\gamma^*$ and the yaw rate $\gamma$ of the vehicle 100. In other words, the control apparatus 20 calculates the steering angle correction value $\delta_{FB}^*$ from the stored relationship $\delta_{FB}^*=G3^*(\gamma^*=\gamma)$, the calculated target yaw rate $\gamma^*$ and the yaw rate $\gamma$ detected by the yaw rate sensor 16. When PI control is performed, for example, the transfer function G3 is expressed as $G3=K_d \cdot [1+1/(\tau c \cdot s)]$, in which $K_d$ is the calculated front wheel steering angle control gain, s is a Laplace operator and $\tau c$ is a time constant. The time constant $\tau c$ is adjusted so that optimal control is carried out. In other words, the control apparatus 20 stores the transfer function G3 expressing the predetermined relationship between the difference $(\gamma^*-\gamma)$ and the steering angle correction value $\delta_{FB}^*$, and calculates the steering angle correction value $\delta_{FB}^*$ in accordance with the calculated front wheel steering angle control gain $K_d$ and the difference $(\gamma^*-\gamma)$.

The control apparatus 20 calculates the target steering angle $\delta^*$ as the sum of the steering angle set value $\delta_{FF}^*$ and the steering angle correction value $\delta_{FB}^*$. In other words, the steering angle set value $\delta_{FF}^*$ is the feed forward component of the target steering angle $\delta^*$, and the steering angle correction value $\delta_{FB}^*$ is the feedback component thereof. During the control of vehicle behavior, sufficient responsiveness is maintained by the feed forward control based on the steering angle set value $\delta_{FF}^*$, while sufficient stability is maintained by the feedback control based on the steering angle correction value $\delta_{FB}^*$.

The control apparatus 20 calculates the target drive current $i_m^*$ of the steering actuator 2 corresponding to the difference $(\delta^*-\delta)$ between the calculated target steering angle $\delta^*$ and the steering angle $\delta$, based on a transfer function G4 expressing the relationship between this difference $(\delta^*-\delta)$ and the target drive current $i_m^*$. In other words, the control apparatus 20 calculates the target drive current $i_m^*$ based on the predetermined and stored relationship $i_m^*=G4 \cdot (\delta^*-\delta)$, the calculated target steering angle $\delta^*$, and the steering angle $\delta$ detected by the steering angle sensor 13. The steering actuator 2 is driven in accordance with this target drive current $i_m^*$. In this way, the steering actuator 2 is controlled by the control apparatus 20 such that the steering angle $\delta$ matches the target steering angle $\delta^*$. When K4 represents gain and $\tau d$ represents a time constant, for example, the transfer function G4 is expressed as $G4=K4[1+1/(\tau d \cdot s)]$ so that PI control is carried out, and the gain K4 and the time constant $\tau d$ are adjusted so that optimum control is performed.

C3 indicates a calculating block in the driving system control apparatus 60 for calculating the instructed brake pressures $\Delta P1$, $\Delta P2$, $\Delta P3$ and $\Delta P4$ of the four wheels 4. In the calculating block C3, the instructed brake pressures $\Delta P1$, $\Delta P2$, $\Delta P3$ and $\Delta P4$ are calculated such that a yaw moment, by which the difference $(\gamma^*-\gamma)$ between the calculated target yaw rate $\gamma^*$ and the yaw rate $\gamma$ is reduced or preferably cancelled, by controlling the braking force applied to the wheels 4. The brake pressure control unit B is controlled based on the instructed brake pressures $\Delta P1$, $\Delta P2$, $\Delta P3$ and $\Delta P4$. By the control of the brake pressure control unit B, the braking force on the inside wheels is increased so that vehicle yaw moment acting toward the inside of the turn is generated when the vehicle 100 is in the understeer condition, and the braking force on the outside wheels is increased so that vehicle yaw moment acting toward the outside of the turn is generated when the vehicle 100 is in the oversteer condition. Therefore, when it is determined that the vehicle 100 is in the understeer condition, the braking forces on the front and rear inside wheels, that maximize the vehicle yaw moment acting toward the inside of the turn, is sought based on a predetermined and stored equation. Also, when it is determined that the vehicle 100 is in the oversteer condition, the braking forces on the front and rear outside wheels, that maximize the vehicle yaw moment acting toward the outside of the turn, is sought based on a predetermined and stored equation. The equation n by which to calculate this braking force $F_X$ is expressed by the equation (36), for example.

To be more precise, the yaw moment M acting on the inside front wheel when the vehicle is in the understeer condition is approximated by the following equation (32)

$$M=L_f F_y + d/2 \cdot F_x \tag{32}$$

Furthermore, the relationship between the tread d and the distance between the front wheels and vehicle center of gravity $L_f$ is approximated by the following equation (33), where $0<a<1$.

$$d/2 = a \cdot L_f \tag{33}$$

By substituting the above equations (32) and (33) for the equation (4), the following equation (34) is obtained.

$$M=L_f(F_y+a \cdot F_x)=L_f\{(\mu^2 \cdot W^2 - F_x^2)^{1/2} \cdot F_o/(\mu \cdot W)+a \cdot F_X\} \tag{34}$$

By substituting 0 for $dM/dF_X$, which is obtained by differentiating the yaw moment M in the above equation (34) with respect to $F_X$, the following equation (35) is obtained.

$$L_f[-F_o \cdot F_x/\{\mu \cdot W \cdot (\mu^2 \cdot W^2 - F_x^2)^{1/2}\}+a]=0 \tag{35}$$

From the above equation (35), if $r=F_o/(\mu \cdot W)$, the braking force $F_x$, which acts on the inside front wheel when the yaw moment M acting on the inside front wheel is maximum, is sought from the equation (36) below.

$$F_x = a \cdot \mu \cdot W/(r^2+a^2)^{1/2} \tag{36}$$

Furthermore, from the equation (4), the inside front wheel cornering force $F_y$ is sought from the equation (37) below.

$$F_y = r F_o/(r^2+a^2)^{1/2} \tag{37}$$

In addition, from the equations (34), (36) and (37), the maximum yaw moment $M_{max}$ acting on the inside front wheel is sought from the equation (38) below.

$$M_{max} = L_f \cdot F_o \cdot (1 + a^2/r^2)^{1/2} \tag{38}$$

When the yaw moment acting on the rear inside wheel is maximum and the vehicle is in the understeer condition, the inside rear wheel braking force $F_x$ is sought from the equation (36), except that the distance between the rear wheels and vehicle center of gravity $L_r$ is substituted for the distance between the front wheels and vehicle center of gravity $L_f$ in the equations (32) through (35). If the tread d of the rear wheels is different from that of the front wheels, the tread d of the rear wheels is used as the adapted value.

When the vehicle is in the oversteer condition, the braking force on the outside front and rear wheels when the yaw moment acting on the outside wheels is maximum is sought from the equation (36) in the same manner as when the vehicle is in the understeer condition.

When it is determined that the vehicle is in the understeer condition in the calculating block C2, the maximum instructed brake pressure necessary to ensure that the calculated brake pressure $F_x$ acts on the front and rear inside wheels is calculated in the calculating block C3. When it is determined that the vehicle is in the oversteer condition in the calculating block C2, the maximum instructed brake pressure necessary to ensure that the calculated brake pressure $F_x$ acts on the front and rear outside wheels is calculated in the calculating block C3. It also calculates the instructed brake pressures ΔP1, ΔP2, ΔP3 and ΔP4 each comprising the maximum instructed braking pressure multiplied by the braking force control gain $K_B$ calculated from the above equation (31). Each calculated instructed brake pressure ΔP1, ΔP2, ΔP3 and ΔP4 is sought as the difference from the respective wheel cylinder pressure $P_{f1}$, $Pf_2$, $P_{r1}$ and $P_{r2}$ detected by the brake pressure sensor 61. In other words, the control apparatus 60 predetermines and stores the relationship between the steering direction, the braking force control gain $K_B$, the wheel cylinder pressure for each wheel 4, and the wheel speed for each wheel 4, and calculates the instructed brake pressures ΔP1, ΔP2, ΔP3 and ΔP4 from this stored relationship, the results of the determination in the calculating block C2 regarding whether the vehicle is in the understeer or oversteer condition, the calculated braking force control gain $K_B$, the steering direction determined from the sign of the operation torque $T_h$ detected by the torque sensor 12, the wheel cylinder pressures $P_{f1}$, $P_{f2}$, $P_{r1}$ and $P_{r2}$ detected by the brake pressure sensors 61, and the wheel speeds ω1, ω2, ω3 and ω4 detected by the wheel speed sensors 62. In this way, the brake pressure control unit B is controlled such that the braking force on the inside front and rear wheels is increased when the vehicle 100 is in the understeer condition, while the braking force on the outside front and rear wheels is increased when the vehicle 100 is in the oversteer condition. When this braking force control gain $K_B$ is at the maximum value $K_{Bmax}$, the total yaw moment due to the cornering force and the braking force is maximized.

Figure 7:
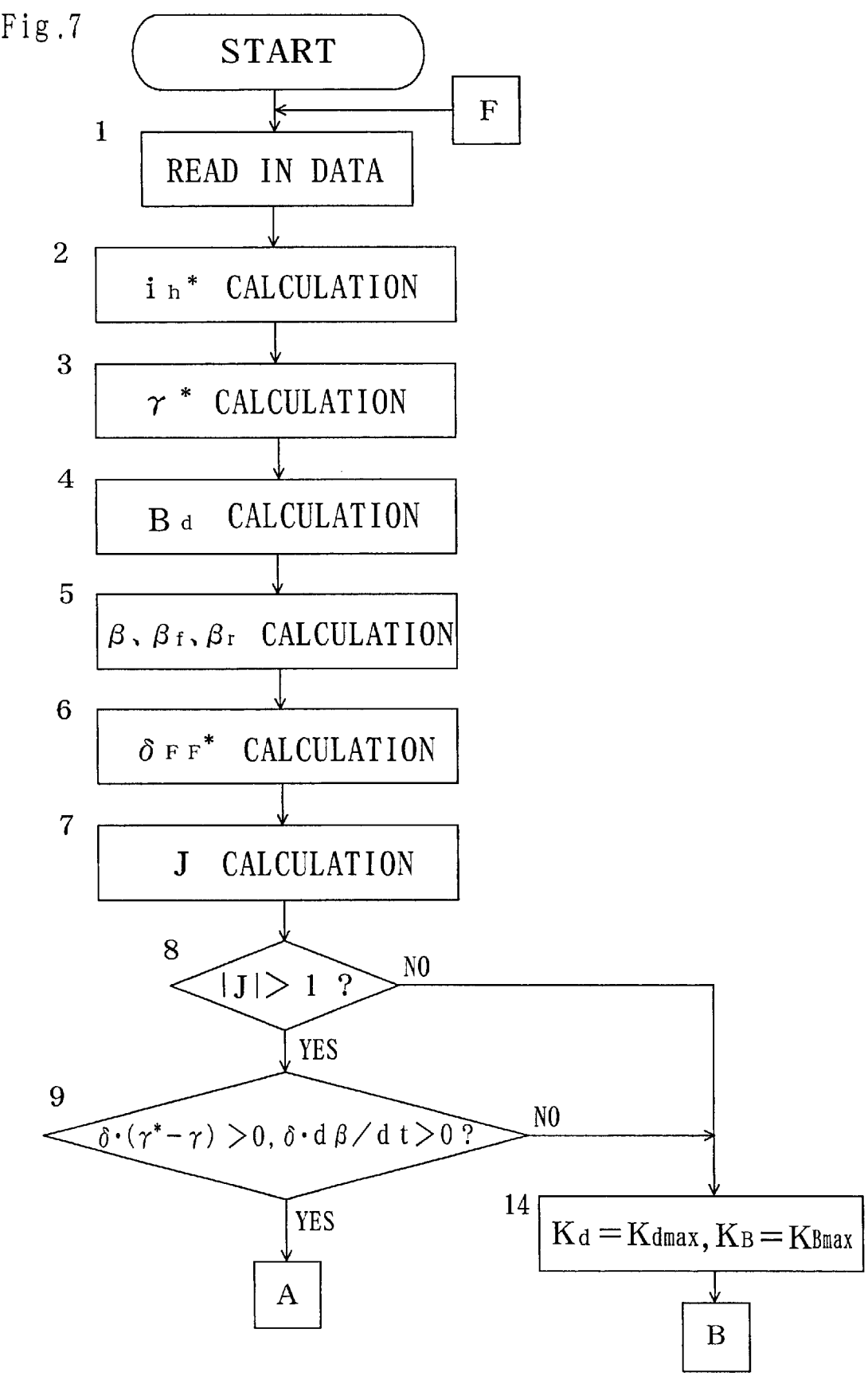
FIG. 7 is a flow chart showing a control process carried out in the attitude control apparatus of the embodiment of the present invention.
Figure 8:
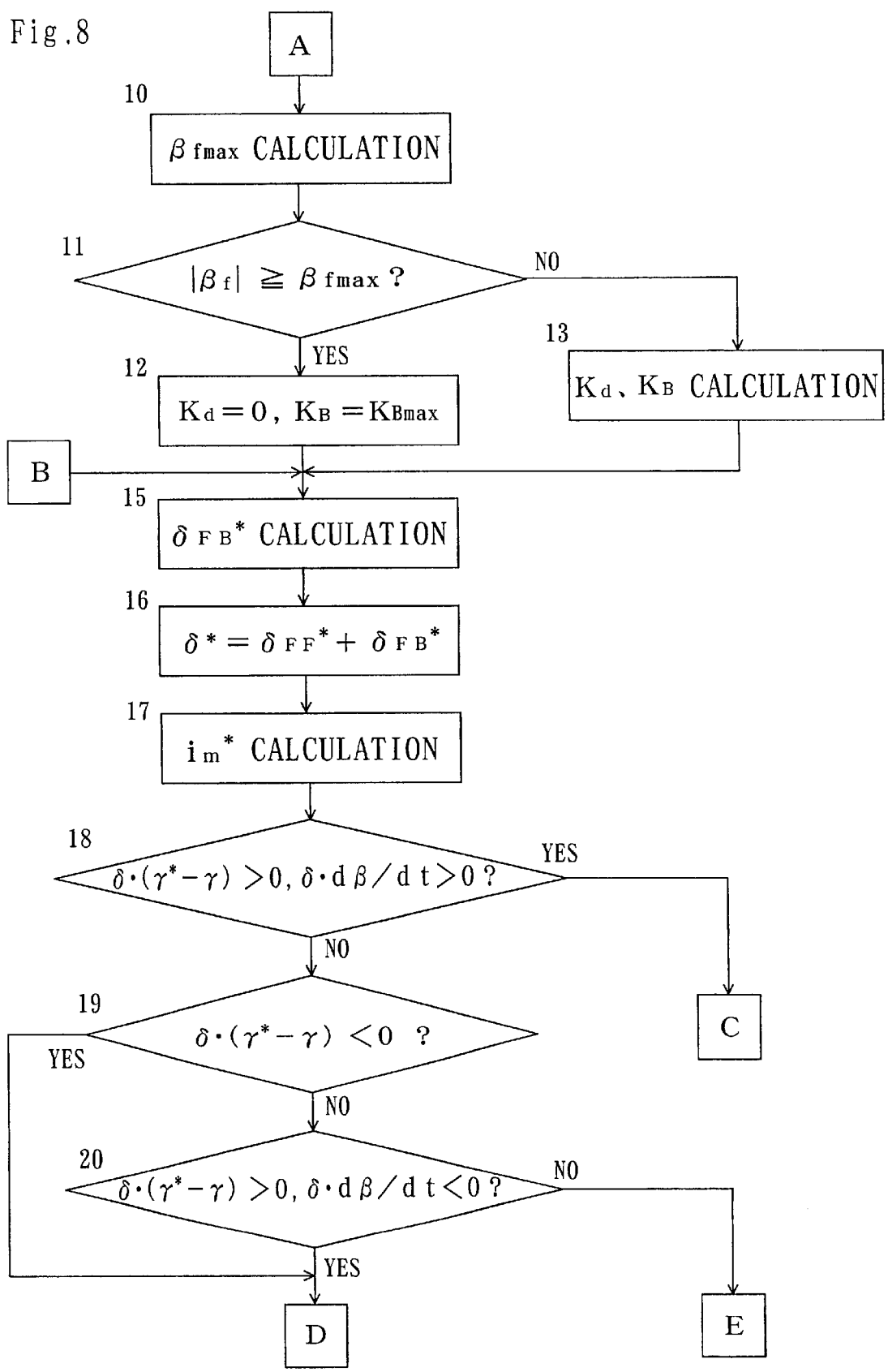
FIG. 8 is a flow chart showing the control process carried out in the attitude control apparatus of the embodiment of the present invention.
Figure 9:
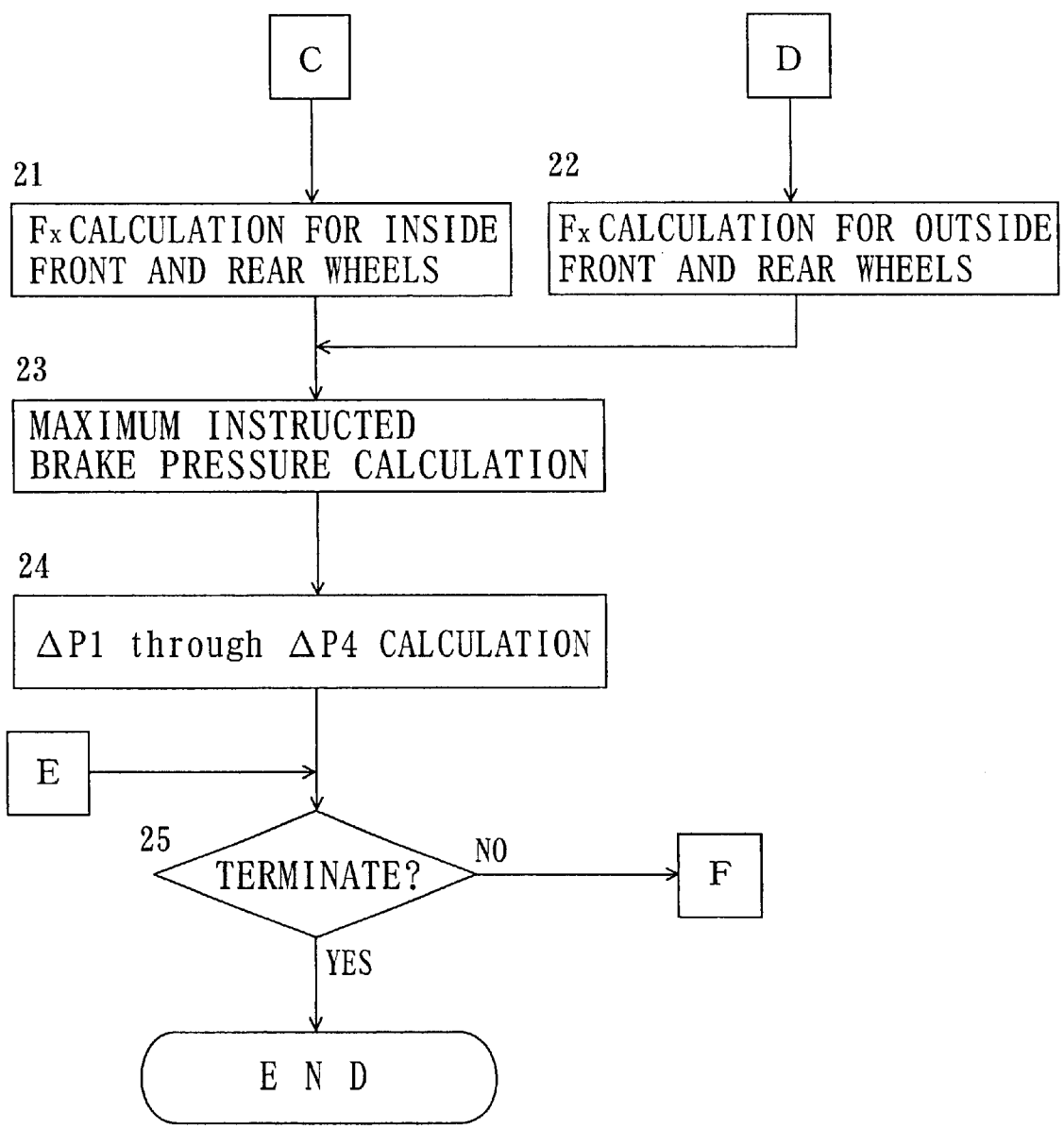
FIG. 9 is a flow chart showing the control process carried out in the attitude control apparatus of the embodiment of the present invention.

The control process executed by the control apparatuses 20 and 60 for the attitude control apparatus is explained below with reference to the flow charts of FIGS. 7 through 9.

First, the data detected by the sensors 11 through 16, 61 and 62 for the operation angle $\delta_h$, the operation torque $T_h$, the steering angle δ, the vehicle speed V, the longitudinal acceleration $G_X$, the lateral acceleration $G_Y$, the yaw rate γ, the wheel cylinder pressures $P_{f1}$, $P_{f2}$, $P_{r1}$ and $P_{r2}$, and the wheel speeds ω1, ω2, ω3 and ω4 are read in (step 1). Next, the target drive current $i_h^*$ for the operation actuator R is sought based on the transfer function G1 so that the difference, which is determined by subtracting the detected operation torque $T_h$ from the target operation torque $T_h^*$ sought from the detected operation angle $\delta_h$ and the gain K1, is zero (step 2). The operation actuator R is controlled through the application of the target drive current $i_h^*$. Next, the target yaw rate γ* in accordance with the operation angle $\delta_h$ is sought based on the transfer function G2 (step 3). The braking force difference $B_d$ in accordance with the wheel braking forces $F_{Xf1}$, $F_{Xr1}$, $F_{Xf2}$ and $F_{Xr2}$, which correspond to the wheel cylinder pressures $P_{f1}$, $P_{f2}$, $P_{r1}$ and $P_{r2}$ detected by the brake pressure sensors 61, is then determined based on the predetermined and stored equation (3) (step 4). Next, the vehicle body lateral slip angle ρ, the front wheel lateral slip angle $\beta_f$, and the rear wheel lateral slip angle $\beta_r$ are calculated based on the equations (5) through (7) in accordance with the vehicle speed V detected by the speed sensor 14, the steering angle δ detected by the steering angle sensor 13, the lateral acceleration $G_Y$ detected by the lateral acceleration sensor 15b, and the yaw rate γ detected by the yaw rate sensor 16 (step 5). The steering angle set value $\delta_{FF}^*$ is calculated based on the equations (8) through (27) in accordance with the vehicle speed V detected by the speed sensor 14, the longitudinal acceleration $G_X$ detected by the longitudinal acceleration sensor 15a, the lateral acceleration $G_Y$ detected by the lateral acceleration sensor 15b, and the wheel cylinder pressures $P_{f1}$, $P_{f2}$, $P_{r1}$ and $P_{r2}$ detected by the brake pressure sensors 61 (step 6). For the calculating of the steering angle set value $\gamma_{FF}^*$, the single-wheel non-braking front wheel cornering power $K_{fo}$, the single-wheel non-braking rear wheel cornering power $K_{ro}$, the front wheel lock pressure $P_f$ under static load and the rear wheel lock pressure $P_r$ under static load are predetermined and stored in the control apparatus 20. Next, the determination coefficient J is calculated based on the equation (28) (step 7), and it is determined whether or not the absolute value of the determination coefficient J exceeds 1, i.e., whether or not the cooperative control of the steering angle and the braking force is necessary (step 8). If the absolute value of the determination coefficient J exceeds 1, it is determined whether or not δ·(γ*−γ) and δ·dβ/dt are positive values (step 9). If δ·(γ*−γ) and δ·dβ/dt are positive values, it is determined that the vehicle 100 is in the understeer condition, and in this case, the front wheel lateral slip angle $\beta_{fmax}$ at the time when the cornering force $F_y'$ corresponds to the maximum lateral force is calculated based on the equation (29) (step 10). Next, it is determined whether or not the absolute value of the calculated front wheel lateral slip angle $\beta_f$ equals or exceeds the front wheel lateral slip angle $\beta_{fmax}$ at maximum lateral force (step 11). If the absolute value of $\beta_f$ equals or exceeds $\beta_{fmax}$, the front wheel steering angle control gain $K_d$ is set to zero, and the braking force control gain $K_B$ is set to the maximum value $K_{Bmax}$ (step 12). If the absolute value of $\beta_f$ is less than $\beta_{fmax}$, the front wheel steering angle control gain $K_d$ is set based on the equation (30), and the braking force control gain $K_B$ is calculated based on the equation (31) (step 13). If the absolute value of the determination coefficient J is equal to or less than 1 in step 8, or if it is not determined in step 9 that the vehicle 100 is in the understeer condition, the front wheel steering angle control gain $K_d$ is set to the maximum value $K_{dmax}$, and the braking force control gain $K_B$ is set to the maximum value $K_{Bmax}$ (step 14). Next, the steering angle correction value $\delta_{FB}^*$ corresponding to the difference (γ*−γ) between the calculated target yaw rate γ* and the detected yaw rate γ is calculated based on the transfer function G3 (step 15). The target steering angle δ* is calculated as the sum of the steering angle set value $δ_{FF}^*$ and the steering angle correction value $δ_{FB}^*$ (step 16). The target drive current $i_m^*$ for the steering actuator 2, which corresponds to the difference between the calculated target steering angle δ* and the steering angle set value o detected by the steering angle sensor 13, is calculated based on the transfer function G4 (step 17). By driving the steering actuator 2 in accordance with the target drive current $i_m^*$, the actuator 2 is controlled such that the steering angle δ matches the target steering angle δ*. In this way, the steering actuator 2 is controlled such that the yaw rate which is the behavior index value matches the target yaw rate γ* which is the calculated target behavior index value. Next, it is determined whether the vehicle is in the understeer condition or the oversteer condition (steps 18 through 20). To be more precise, if δ·(γ*−γ) and γ*·dβ/dt are determined to be positive values, it is determined that the vehicle 100 is in the understeer condition. If δ·(γ*−γ) is negative, or if δ·(γ*−γ) is positive and γ·dβ/dt is negative, it is determined that the vehicle 100 is in the oversteer condition. If the vehicle is neither in the understeer nor the oversteer condition, the control advances to step 25. If the vehicle is in the understeer condition, the braking force to be applied to the front and rear inside wheels is calculated from the equation (36) (step 21), while if the vehicle is in the oversteer condition, the braking force to be applied to the front and rear outside wheels is calculated from the equation (36) (step 22). In this braking force calculation, the non-braking cornering force $F_o$ is predetermined and stored in the control apparatus 20. The maximum instructed brake pressure needed for the application of the calculated braking force $F_x$ is then calculated (step 23). The instructed brake pressures ΔP1, ΔP2, ΔP3 and ΔP4 each comprising the maximum instructed braking pressure multiplied by the sought braking force control gain $K_B$ are calculated in accordance with the wheel cylinder pressures $P_{f1}$, $P_{f2}$, $P_{r1}$ and $P_{r2}$ detected by the brake pressure sensors 61 and the wheel speeds ω1, ω2, ω3 and ω4 detected by the wheel speed sensors 62 (step 24). The braking force applied to each wheel 4 is controlled by means of the brake pressure control unit B by changing the braking force applied in accordance with the calculated brake pressures ΔP1, ΔP2, ΔP3 and ΔP4. In this way, when the vehicle is in the understeer condition, the braking force applied to the front and rear inside wheels is controlled so as to increase, so that the braking force applied to the inside wheels becomes larger than the braking force applied to the outside wheels, and the vehicle yaw moment acting toward the inside of the turn is generated. When the vehicle is in the oversteer condition, the braking force applied to the front and rear outside wheels is controlled so as to increase, so that the braking force applied to the outside wheels becomes larger than the braking force applied to the inside wheels, and the vehicle yaw moment acting toward the outside of the turn is generated. It is then determined whether or not control is to be terminated (step 25), and if control is not to be terminated, the control returns to step 1. This termination determination can be made by determining whether or not the vehicle ignition switch is ON, for example.

According to the above constitution, because braking force is applied not only to the rear inside wheel but also to the front inside wheel when the vehicle is in the understeer condition, the yaw moment that acts toward the inside of the turn can be generated. Furthermore, when the vehicle is in the oversteer condition, because braking force is applied not only to the front outside wheel but also to the rear outside wheel, the yaw moment that acts toward the outside of the turn can be generated. In this way, the yaw moment that stabilizes the vehicle's behavior is increased beyond the level obtainable in the conventional art.

When the steering actuator 2 is controlled so that the difference between the target yaw rate γ* corresponding to the amount of operation of the steering wheel 1 and the sought yaw rate γ is reduced, the occurrence of the understeer condition or the oversteer condition due to the movement of the steering actuator 2 can be prevented by the application of braking force. In other words, the vehicle's behavior is stabilized by the cooperative control of the steering angle and the braking force.

When the sought yaw rate γ is less than the target yaw rate γ*, it is determined whether the vehicle body lateral slip angle β is changing so as to bring the yaw rate γ closer to the target yaw rate γ* or to move it away from the target yaw rate γ*. In the oversteer condition, when the sought yaw rate γ reaches a value which is less than the target yaw rate γ* corresponding to the amount of operation of the steering wheel 1 by the counter steering operation, the vehicle body lateral slip angle β changes such that the yaw rate γ moves away from the target yaw rate γ*, and consequently the vehicle is determined to be in the oversteer condition. In this way, when the counter steering operation is performed to eliminate the oversteer condition, the braking force can also be applied to eliminate the oversteer condition. Therefore, a conflict between steering control and braking force control can be prevented, and the vehicle's behavior is stabilized.

Furthermore, when the vehicle is in the understeer condition, if the absolute value of the front wheel lateral slip angle $β_f$ equals or exceeds the front wheel lateral slip angle $β_{fmax}$ at maximum lateral force, the braking force, that maximizes the vehicle yaw moment acting toward the inside of the turn, is applied to the inside wheels, and the amount of control of the steering actuator 2 required to ensure that the yaw rate γ matches the target yaw rate γ* is minimized. Moreover, when the vehicle is in the understeer condition, if the absolute value of the front wheel lateral slip angle $β_f$ is less than the front wheel lateral slip angle $β_{fmax}$ at maximum lateral force, as the absolute value of the front wheel lateral slip angle $β_f$ declines, the amount of control of the braking force decreases and the amount of control of the steering actuator 2 required to ensure that the yaw rate γ matches the target yaw rate γ* increases. Through this cooperative control of the steering angle and the braking force, when the vehicle is in the understeer condition, the excessive increase in the steering angle, the excessive application of braking force on the inside wheels, and the reduction in the yaw moment that acts to stabilize the vehicle can be prevented. In addition, the amount of braking force stabilizing the vehicle behavior can be increased as the vehicle's behavior becomes more unstable and the front wheel lateral slip angle becomes larger, without the need for any complicated control process. Because this cooperative control of the steering angle and the braking force is executed only when the absolute value of the determination coefficient J exceeds 1, the steering angle and braking force do not fluctuate more than necessary when the yaw rate γ is made to match the target yaw rate γ*. Therefore, the deterioration of the feeling in the steering operation is prevented. Furthermore, because the excessive increase in the steering angle when the vehicle is in the understeer condition is prevented, the linear region in which the tire lateral slip angle is proportional to the cornering force is maintained, and instability in the vehicle's behavior is reliably prevented.

When the steering actuator 2 is controlled in accordance with the target steering angle δ* comprising the sum of the steering angle set value $\delta_{FF}*$ and the steering angle correction value $\delta_{FB}*$, because the steering angle set value $\delta_{FF}*$ corresponds to the feed forward component of the target steering angle $\delta*$ and the steering angle correction value $\delta_{FB}*$ corresponds to the feedback component, the feed forward control and the feedback control are performed. The steering angle set value $\delta_{FF}*$ corresponds to the target yaw rate $\gamma*$ reflecting the operation angle $\delta h$ of the steering wheel 1, and the braking force difference $B_d$ between the right and left wheels. The steering angle correction value $\delta_{FB}*$ corresponds to the difference between the target yaw rate $\gamma*$ and the sought yaw rate $\gamma$. In other words, because the steering angle set value $\delta_{FF}*$ is determined in accordance with not only the operation angle $\delta h$ of the steering wheel 1 but also with the braking force difference $B_d$ between the right and left wheels, when the vehicle's behavior is to be stabilized by the braking force control, the steering angle can be controlled by the feed forward control in accordance with the braking force difference $B_d$. Therefore, in comparison with the feedback control of the steering angle in accordance with the yaw rate $\gamma$ resulting from the braking force control only, the responsiveness of the control can be improved and stabilization of the vehicle's behavior can be increased.

In the above embodiment, stabilization of the vehicle's behavior is attained by individual control of the right and left wheels 4 such that the drive power applied to the outside wheels 4 is larger than the drive power applied to the inside wheels 4 when the vehicle is in the understeer condition, and the drive power applied to the inside wheels 4 is larger than the drive power applied to the outside wheels 4 when the vehicle is in the oversteer condition. In this case, the drive power applied to each wheel 4 is sought from the number of revolutions of the wheel and the transmitting torque, for example, and the drive power difference between the drive power applied to the inside wheels 4 and that applied to the outside wheels 4 is sought by the driving system control apparatus 60, and the steering angle set value $\delta_{FF}*$ corresponding to the drive power difference and the target yaw rate $\gamma*$ is calculated based on the stored relationship between the target yaw rate, the drive power difference and the steering angle set value. The equations by which to calculate the steering angle set value $\delta_{FF}*$ are obtained by replacing the braking forces $F_{Xf1}, F_{Xr1}, F_{Xf2}$ and $F_{Xr2}$ on each wheel in the equations (2), (3), and (8) through (27) with the drive powers for each wheel, and by replacing the braking force difference $B_d$ with the drive power difference. In all other respects, the constitution to control the steering angle is identical to that of the above embodiment. In this way, when the steering actuator 2 is controlled in accordance with the target steering angle $\delta*$ comprising the sum of the steering angle set value $\delta_{FF}*$ and the steering angle correction value $\delta_{FB}*$, because the steering angle set value $\delta_{FF}*$ corresponds to the feed forward component of the target steering angle $\delta*$ and the steering angle correction value $\delta_{FB}*$ corresponds to the feedback component thereof, the feed forward control and feedback control is performed. The steering angle set value $\delta_{FF}*$ corresponds to the target yaw rate $\gamma*$ reflecting the operation angle $\delta h$ of the steering wheel 1, and the drive power difference between the right and left wheels. The steering angle correction value $\delta_{FB}*$ corresponds to the difference between the target yaw rate $\gamma*$ and the sought yaw rate $\gamma$. In this case, because the steering angle set value $\delta_{FF}*$ is determined in accordance with not only the operation angle $\delta h$ of the steering wheel 1 but also the drive power difference between the right and left wheels, when the vehicle's behavior is to be stabilized by the drive power control, the steering angle can be controlled by the feed forward control in accordance with the drive power difference. Therefore, in comparison with the feedback control of the steering angle in accordance with the yaw rate $\gamma$ resulting from the drive power control, the responsiveness of the control is improved and stabilization of the vehicle's behavior can be increased. Furthermore, there is no particular limitation regarding the means by which to control the drive power supplied to each of the wheels 4. For example, in a four-wheel drive vehicle in which the engine output is transmitted to each of the four wheels through front and rear differential gears, a hydraulic power transmission mechanism comprising a hydraulic pump and a hydraulic actuator is located in the power transmission system between each differential gear and each wheel, so that the drive power to each wheel is individually controlled by controlling the current to electromagnetic valves controlling the discharge pressure of each hydraulic pump. Again, in a four-wheel drive vehicle in which each wheel is individually driven by an electric motor, the drive power supplied to each wheel is controlled through the control of current to each electric motor.

The present invention is not limited to the embodiments described above. For example, the present invention can also be applied in a vehicle in which the steering wheel is mechanically connected to the wheels. Furthermore, the operation torque detected by the torque sensor can be used as the amount of operation of the operation member.

What is claimed is:

1. A vehicle attitude control apparatus that can individually control a braking force applied to right and left wheels including inside wheels and outside wheels such that when the vehicle is in an understeer condition, the braking force applied to the inside wheels is larger than the braking force applied to the outside wheels, and when the vehicle is in an oversteer condition, the braking force applied to the outside wheels is larger than the braking force applied to the inside wheels, said vehicle attitude control apparatus comprising:

an operation member;

a steering actuator that is driven in accordance with the operation of said operation member;

means for transmitting the movement of said steering actuator to the wheels so that a steering angle changes in response to the movement of said steering actuator;

a sensor to seek a behavior index value corresponding to a change in the behavior of the vehicle that occurs based on the change in the steering angle;

a sensor to seek an amount of operation of said operation member;

means for seeking a target behavior index value corresponding to the sought amount of operation based on a stored relationship between said amount of operation and the target behavior index value;

sensors to seek the braking force applied to each wheel;

means for seeking a braking force difference between the braking force applied to the inside wheels and the braking force applied to the outside wheels;

means for calculating a steering angle set value corresponding to the sought target behavior index value and braking force difference based on a stored relationship between the target behavior index value, the braking force difference and the steering angle set value;

means for calculating a steering angle correction value corresponding to a difference between the target behavior index value and the sought behavior index value based on a stored relationship between said difference and the steering angle correction value; and means for controlling said steering actuator so that the steering angle matches a target steering angle which is a sum of the steering angle set value and the steering angle correction value.

2. A vehicle attitude control apparatus that can individually control a drive power applied to right and left wheels including inside wheels and outside wheels so that when the vehicle is in an understeer condition, the drive power applied to the outside wheels is larger than the drive power applied to the inside wheels, and when the vehicle is in an oversteer condition, the drive power applied to the inside wheels is larger than the drive power applied to the outside wheels, said vehicle attitude control apparatus comprising:

an operation member;

a steering actuator that is driven in accordance with the operation of said operation member;

means for transmitting the movement of said steering actuator to the wheels so that a steering angle changes in response to the movement of said steering actuator;

a sensor to seek a behavior index value corresponding to a change in the movement of the vehicle that occurs based on the change in the steering angle;

a sensor to seek an amount of operation of said operation member;

means for seeking a target behavior index value corresponding to the sought amount of operation based on a stored relationship between said amount of operation and the target behavior index value;

means for seeking the drive power applied to each wheel;

means for seeking a drive power difference between the drive power applied to the inside wheels and the drive power applied to the outside wheels;

means for calculating a steering angle set value corresponding to the sought target behavior index value and drive power difference based on a stored relationship between the target behavior index value, the drive power difference and the steering angle set value;

means for calculating a steering angle correction value corresponding to a difference between the target behavior index value and the sought behavior index value based on a stored relationship between said difference and the steering angle correction value; and means for controlling said steering actuator so that the steering angle matches a target steering angle which is the sum of the steering angle set value and the steering angle correction value.

3. A vehicle attitude control apparatus that can individually control a braking force applied to right and left wheels including inside wheels and outside wheels such that when the vehicle is in an understeer condition, the braking force applied to the inside wheels is larger than the braking force applied to the outside wheels, and when the vehicle is in an oversteer condition, the braking force applied to the outside wheels is larger than the braking force applied to the inside wheels, said vehicle attitude control apparatus comprising:

an operation member;

a steering actuator that is driven in accordance with the operation of said operation member;

means for transmitting the movement of said steering actuator to the wheels so that a steering angle changes in response to the movement of said steering actuator;

a sensor to seek a behavior index value corresponding to a change in the movement of the vehicle that occurs based on the change in the steering angle;

a sensor to seek an amount of operation of said operation member;

means for seeking a target behavior index value corresponding to a sought amount of operation based on a stored relationship between said amount of operation and the target behavior index value;

means for controlling said steering actuator so that the behavior index value matches the sought target behavior index value;

means for seeking a wheel lateral slip angle;

means for seeking, based on a stored equation, the braking force applied to the inside wheel that maximizes a vehicle yaw moment acting toward the inside of the turn, when the vehicle is determined to be in the understeer condition; and means for determining whether or not the size of a sought wheel lateral slip angle equals or exceeds a predetermined maximum value when it is determined that the vehicle is in the understeer condition, wherein:

when the sought wheel lateral slip angle equals or exceeds said predetermined maximum value, braking force control is performed so that a sought braking force is applied, and the amount of control of the steering actuator to ensure that the behavior index value matches the target behavior index value is minimized, and when the sought wheel lateral slip angle is less than said predetermined maximum value, as the sought wheel lateral slip angle decreases, the amount of braking force control is reduced and the amount of control of the steering actuator to ensure that the behavior index value matches the target behavior index value is increased.

4. The vehicle attitude control apparatus according to claim 3, further comprising means for determining whether or not at least one of a value corresponding to a size of a vehicle body lateral slip angle, and a value corresponding to a size of the rate of change of the vehicle body lateral slip angle, exceeds a predetermined positive number value, wherein when neither the value corresponding to the size of the vehicle body lateral slip angle nor the value corresponding to the size of the rate of change of the vehicle body lateral slip angle exceeds the predetermined positive number value, the amount of control of the braking force and the amount of control of the steering actuator in connection with the wheel lateral slip angle are set at a fixed level regardless of the size of the sought wheel lateral slip angle.

5. The vehicle attitude control apparatus according to claim 3, wherein said predetermined maximum value for the wheel lateral slip angle does not exceed the maximum value at which a linear region, in which a cornering force is proportional to the wheel lateral slip angle, is maintained.

6. The vehicle attitude control apparatus according to claim 4, wherein said stored equation is expressed as $$F_X = a \cdot \mu \cdot W/(r^2 + a^2)^{1/2}$$

where $F_X$ represents the braking force, W represents a tire load on each wheel, and $\mu$ represents a coefficient of friction between a road surface and a tire of each wheel, and r is sought from the relationship $r = F_o/(\mu \cdot W)$, where $F_o$ represents a non-braking cornering force, and wherein when the braking force on front wheels of said right and left wheels is calculated, a is sought from the relationship $d/2 = a \cdot L_f$, where $L_f$ represents a distance between the front wheels and a vehicle's center of gravity, and d represents a front wheel tread, whereas when the braking force on rear wheels of said right and left wheels is calculated, a is sought from the relationship d/2=a·$L_r$, where $L_r$ represents a distance between the rear wheels and the vehicle's center of gravity, and d represents a rear wheel tread.

7. The vehicle attitude control apparatus according to claim 3, said apparatus further comprising:
sensors to seek the braking force applied to each wheel;
means for seeking a braking force difference between the braking force applied to the inside wheel and the braking force applied to the outside wheel;
means for calculating a steering angle set value corresponding to the sought target behavior index value and braking force difference based on a stored relationship between the target behavior index value, the braking force difference and the steering angle set value; and
means for calculating a steering angle correction value corresponding to a difference between the target behavior index value and the sought behavior index value based on a stored relationship between said difference and the steering angle correction value,
wherein the behavior index value is matched to the target behavior index value, by controlling said steering actuator such that the steering angle matches a target steering angle which is a sum of the steering angle set value and the steering angle correction value.

8. A vehicle attitude control apparatus that can individually control a braking force applied to right and left wheels including inside wheels and outside wheels such that the braking force applied to the inside wheels is larger than the braking force applied to the outside wheels when the vehicle is in an understeer condition, and the braking force applied to the outside wheels is larger than the braking force applied to the inside wheels when the vehicle is in an oversteer condition, wherein the control is performed such that the braking force applied to both front and rear inside wheels of said right and left wheels is increased when the vehicle is in the understeer condition, and the braking force applied to both front and rear outside wheels of said right and left wheels is increased when the vehicle is in the oversteer condition.

9. The vehicle attitude control apparatus according to claim 8, further comprising:
an operation member;
a steering actuator that is driven in accordance with the operation of said operation member;
means for transmitting a movement of said steering actuator to the wheels so that the steering angle changes in response to the movement of said actuator;
a sensor to seek a behavior index value corresponding to a change in the movement of the vehicle that occurs based on the change in the steering angle;
a sensor to seek an amount of operation of said operation member;
means for seeking a target behavior index value corresponding to the sought amount of operation based on a stored relationship between said amount of operation and the target behavior index value;
means for controlling said steering actuator so that the behavior index value matches the sought target behavior index value;
means for determining whether the vehicle is in the understeer condition or the oversteer condition, based on at least the sought behavior index value and the target behavior index value;
means for seeking the braking force applied to the front and rear inside wheels that maximizes a vehicle yaw moment acting toward an inside of a turn, when the vehicle is determined to be in the understeer condition, based on a stored equation; and
means for seeking the braking force applied to the front and rear outside wheels that maximizes the vehicle yaw moment acting toward the outside of the turn, when the vehicle is determined to be in the oversteer condition, based on a stored equation.

10. The vehicle attitude control apparatus according to claim 9, further comprising means for seeking a vehicle body lateral slip angle in time series, wherein:
when the sought behavior index value is less than the target behavior index value and the sought vehicle body lateral slip angle is changing so as to bring the behavior index value closer to the target behavior index value, it is determined that the vehicle is in the understeer condition;
when the sought behavior index value is less than the target behavior index value and the sought vehicle body lateral slip angle is changing so as to move the behavior index value away from the target behavior index value, it is determined that the vehicle is in the oversteer condition; and
when the sought behavior index value exceeds the target behavior index value, it is determined that the vehicle is in the oversteer condition.

11. The vehicle attitude control apparatus according to claim 9, further comprising means for seeking a wheel lateral slip angle, and means for determining whether or not the size of the sought wheel lateral slip angle equals or exceeds a predetermined maximum value when the vehicle is determined to be in the understeer condition, wherein:
when the sought wheel lateral slip angle equals or exceeds the predetermined maximum value, the braking force control is performed so that the sought braking force is applied, and the amount of control of the steering actuator to ensure that the behavior index value matches the target behavior index value is minimized; and
when the sought wheel lateral slip angle is less than the predetermined maximum value, as the sought wheel lateral slip angle decreases, the amount of braking force control is reduced and the amount of control of the steering actuator to ensure that the behavior index value matches the target behavior index value is increased.

12. The vehicle attitude control apparatus according to claim 9, wherein said stored equation is expressed a $$F_X = a \cdot \mu \cdot W/(r^2+a^2)^{1/2}$$

where $F_X$ represents the braking force, W represents a tire load on each wheel, and $\mu$ represents a coefficient of friction between a road surface and a tire of each wheel, and r is sought from the relationship $r=F_o/(\mu \cdot W)$, where $F_o$ represents a non-braking cornering force, and
wherein when the braking force on front wheels of said right and left wheels is calculated, a is sought from the relationship d/2=a·$L_f$, where $L_f$ represents a distance between the front wheels and a vehicle's center of gravity, and d represents a front wheel tread, whereas when the braking force on rear wheels of said right and left wheels is calculated, a is sought from the relationship d/2=a·$L_r$, where $L_r$ represents a distance between the rear wheels and the vehicle's center of gravity, and d represents a rear wheel tread.

13. The vehicle attitude control apparatus according to claim 9, said apparatus further comprising:

sensors to seek the braking force applied to each wheel;

means for seeking a braking force difference between the braking force applied to the inside wheel and the braking force applied to the outside wheel;

means for calculating a steering angle set value corresponding to the sought target behavior index value and braking force difference based on a stored relationship between the target behavior index value, the braking force difference and the steering angle set value; and means for calculating a steering angle correction value corresponding to a difference between the target behavior index value and the sought behavior index value based on a stored relationship between said difference and the steering angle correction value, wherein the behavior index value is matched to the target behavior index value, by controlling said steering actuator such that the steering angle matches a target steering angle which is a sum of the steering angle set value and the steering angle correction value.

14. The vehicle attitude control apparatus according to claim 11, further comprising means for determining whether or not at least one of a value corresponding to a size of a vehicle body lateral slip angle, and a value corresponding to a size of the rate of change of the vehicle body lateral slip angle, exceeds a predetermined positive number value, wherein when neither the value corresponding to the size of the vehicle body lateral slip angle nor the value corresponding to the size of the rate of change of the vehicle body lateral slip angle exceeds the predetermined positive number value, the amount of control of the braking force and the amount of control of the steering actuator in connection with the wheel lateral slip angle are set at a fixed level regardless of the size of the sought wheel lateral slip angle.

15. The vehicle attitude control apparatus according to claim 11, wherein said predetermined maximum value for the wheel lateral slip angle does not exceed the maximum value at which a linear region, in which a cornering force is proportional to the wheel lateral slip angle, is maintained.

16. The vehicle attitude control apparatus according to claim 1, wherein a steering gear is used as a means for transmitting the movement of the steering actuator to the wheels so that the steering angle changes in response to the movement of said steering actuator.

17. The vehicle attitude control apparatus according to claim 2, wherein a steering gear is used as a means for transmitting the movement of the steering actuator to the wheels so that the steering angle changes in response to the movement of said steering actuator.

18. The vehicle attitude control apparatus according to claim 3, wherein a steering gear is used as a means for transmitting the movement of the steering actuator to the wheels so that the steering angle changes in response to the movement of said steering actuator.

19. The vehicle attitude control apparatus according to claim 9, wherein a steering gear is used as a means for transmitting the movement of the steering actuator to the wheels so that the steering angle changes in response to the movement of said steering actuator.

* * * * *